(12) United States Patent
Imai

(10) Patent No.: US 11,623,340 B2
(45) Date of Patent: Apr. 11, 2023

(54) ROBOT SYSTEM, CONTROL APPARATUS, AND CONTROL METHOD

(71) Applicant: Seiko Epson Corporation, Tokyo (JP)

(72) Inventor: Ryosuke Imai, Matsumoto (JP)

(73) Assignee: SEIKO EPSON CORPORATION

( * ) Notice: Subject to any disclaimer, the term of this patent is extended or adjusted under 35 U.S.C. 154(b) by 460 days.

(21) Appl. No.: 16/816,442

(22) Filed: Mar. 12, 2020

(65) Prior Publication Data
US 2020/0290199 A1    Sep. 17, 2020

(30) Foreign Application Priority Data
Mar. 13, 2019    (JP) ............................ JP2019-045633

(51) Int. Cl.
| | | |
|---|---|---|
| B25J 13/08 | (2006.01) | |
| B25J 9/04 | (2006.01) | |
| B25J 9/00 | (2006.01) | |
| B25J 9/12 | (2006.01) | |
| B25J 19/02 | (2006.01) | |

(52) U.S. Cl.
CPC ............. B25J 9/04 (2013.01); B25J 9/0012 (2013.01); B25J 9/123 (2013.01); B25J 13/088 (2013.01); B25J 19/02 (2013.01)

(58) Field of Classification Search
CPC ............ B25J 9/0012; B25J 9/04; B25J 9/123; B25J 13/088; B25J 19/02
See application file for complete search history.

(56) References Cited

U.S. PATENT DOCUMENTS

| | | | |
|---|---|---|---|
| 2012/0296471 A1* | 11/2012 | Inaba | B25J 9/1694 |
| | | | 901/42 |
| 2013/0190926 A1* | 7/2013 | Motoyoshi | B25J 9/1653 |
| | | | 700/254 |
| 2015/0321357 A1 | 11/2015 | Igarashi et al. | |
| 2017/0120444 A1* | 5/2017 | Motoyoshi | B25J 9/046 |

FOREIGN PATENT DOCUMENTS

| | | |
|---|---|---|
| JP | 2011-093066 A | 5/2011 |
| JP | 2012-171052 A | 9/2012 |
| JP | 2013-146827 A | 8/2013 |
| JP | 2017-042836 A | 3/2017 |
| JP | 2017-056543 A | 3/2017 |

* cited by examiner

Primary Examiner — Dale Moyer
(74) Attorney, Agent, or Firm — Harness, Dickey & Pierce, P.L.C.

(57) ABSTRACT

A robot system includes a robot having an arm pivoting about a pivot axis (first pivot axis), a motor (first motor) pivoting the arm, a shaft (spline shaft) coupled to the arm and moving in an axial direction of a linear motion axis parallel to the pivot axis, and an inertial sensor provided in the arm or shaft, and a control apparatus having a control unit controlling the motor, wherein the inertial sensor detects an angular velocity about a roll axis orthogonal to the pivot axis and the linear motion axis or an acceleration in a tangential direction of a circle around the roll axis, and the control unit controls the motor based on information representing a pivot direction of the arm about the roll axis when the arm stops or decelerates and output from the inertial sensor.

16 Claims, 14 Drawing Sheets

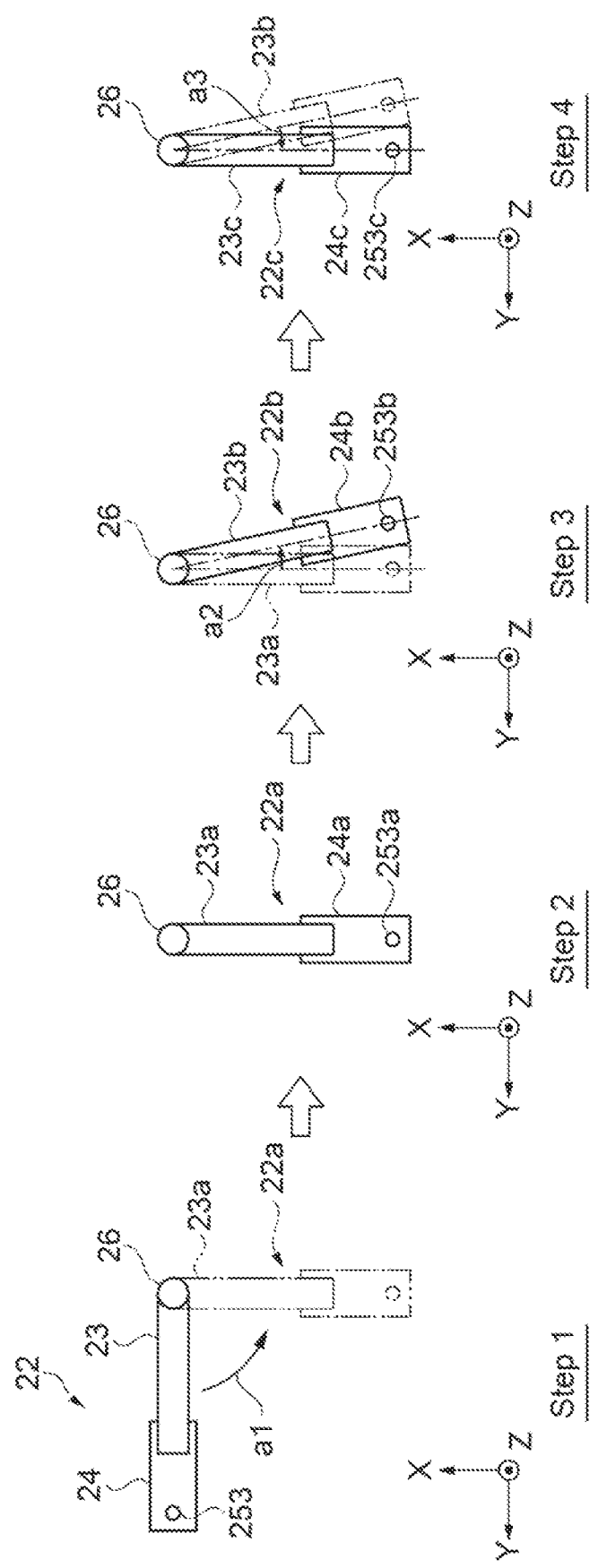

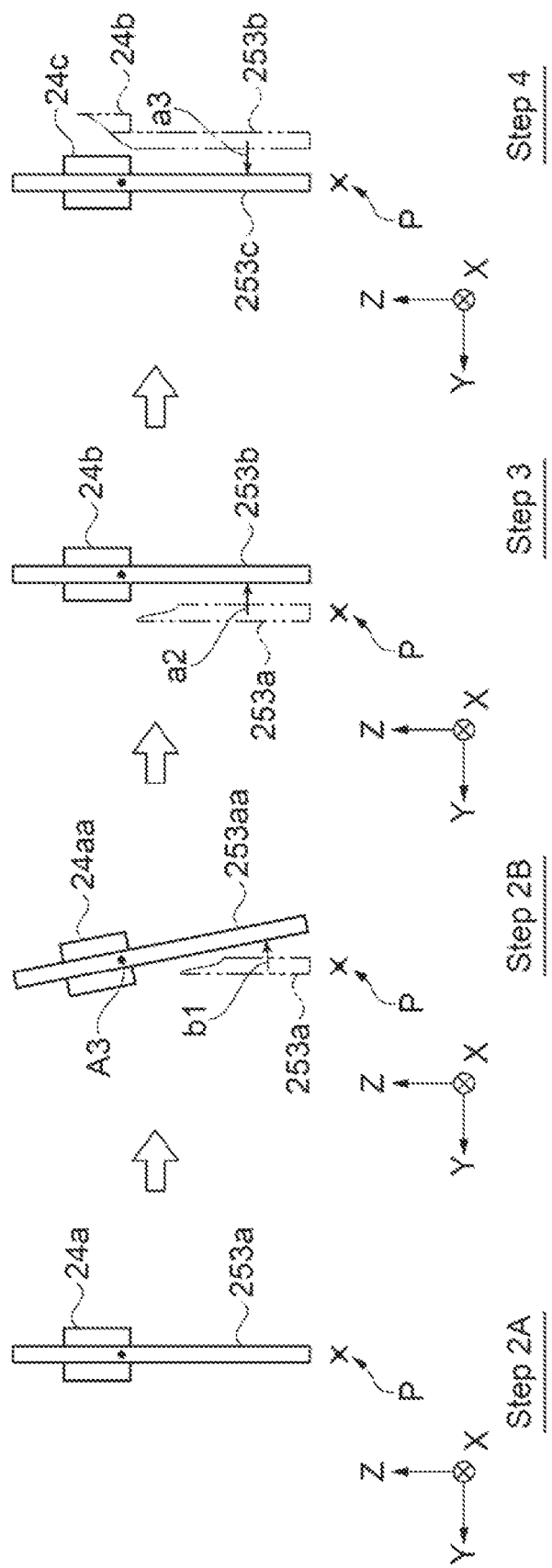

| SPLINE LENGTH D [mm] | CORRECTION SIGN |
|---|---|
| 0 | MINUS |
| 10 | MINUS |
| 20 | MINUS |
| ... | |
| 160 | MINUS |
| 170 | PLUS |
| 180 | PLUS |

ROBOT SYSTEM, CONTROL APPARATUS, AND CONTROL METHOD

The present application is based on, and claims priority from JP Application Serial Number 2019-045633, filed Mar. 13, 2019, the disclosure of which is hereby incorporated by reference herein in its entirety.

BACKGROUND

1. Technical Field

The present disclosure relates to a robot system, control apparatus, and control method.

2. Related Art

In related art, as a robot conveying components etc., for example, JP-A-2012-171052 discloses a horizontal articulated robot also called a scalar robot. The robot described in JP-A-2012-171052 has a base, a first arm coupled to an upper end portion of the base and pivoting around an axial center along a vertical direction relative to the base, a second arm coupled to a distal end portion of the first arm and pivoting around an axial center along the vertical direction relative to the first arm, and a spline shaft provided in a distal end portion of the second arm and displaced relative to the second arm. Further, an angular velocity sensor that measures an angular velocity of the second arm relative to the base is placed within the second arm.

The actuation of the robot having the above described configuration is controlled by a control apparatus. The control apparatus may calculate an angular velocity of the first arm based on various signals input from the angular velocity sensor placed within the second arm etc., and control a motor that pivots the first arm to suppress vibration of the second arm as vibration in horizontal directions.

In the robot described in JP-A-2012-171052, the vibration generated in the second arm includes vibration about an axis along the longitudinal direction of the second arm in the so-called roll directions in addition to the vibration in the horizontal directions. In the robot described in JP-A-2012-171052, as described above, the vibration of the second arm in the horizontal directions is suppressed, however, suppression of the vibration about the axis along the longitudinal direction of the second arm is not considered.

SUMMARY

A robot system according to this application includes a robot having an arm pivoting about a pivot axis, a motor pivoting the arm about the pivot axis, a shaft coupled to the arm and moving in an axial direction of a linear motion axis parallel to the pivot axis, and an inertial sensor provided in the arm or shaft, and a control apparatus having a control unit controlling the motor, wherein the inertial sensor detects an angular velocity about a roll axis orthogonal to the pivot axis and the linear motion axis or an acceleration in a tangential direction of a circle around the roll axis, and the control unit controls the motor based on information representing a pivot direction of the arm about the roll axis when the arm stops or decelerates and output from the inertial sensor.

A robot system according to this application includes a robot having an arm including a first arm pivoting about a first pivot axis and a second arm coupled to the first arm and pivoting about a second pivot axis parallel to the first pivot axis, a first motor pivoting the first arm about the first pivot axis, a shaft coupled to the second arm and moving in an axial direction of a linear motion axis parallel to the pivot axis, and an inertial sensor provided in the second arm or the shaft, and a control apparatus having a control unit controlling the first motor, wherein the inertial sensor detects an angular velocity about a roll axis orthogonal to the pivot axis and the linear motion axis or an acceleration in a tangential direction of a circle around the roll axis, and the control unit controls the first motor based on information representing a pivot direction of the arm about the roll axis when the arm stops or decelerates and output from the inertial sensor.

In the above described robot system, the information may be obtained based on the output from the inertial sensor.

In the above described robot system, the control unit may have a memory unit, and the information may be stored in the memory unit.

In the above described robot system, the information may have first information representing the pivot direction when the shaft is located in a first position and second information representing the pivot direction when the shaft is located in a second position higher than the first position.

In the above described robot system, the control unit may control the motor without using the information when the shaft is located between the first position and the second position.

In the above described robot system, the shaft may be provided with a load, and the information may be based on a weight of the load.

In the above described robot system, a member forming an outer surface of the arm may contain a resin.

A control apparatus according to this application is a control apparatus for a robot having an arm pivoting about a pivot axis by a motor, a shaft coupled to the arm and moving in an axial direction of a linear motion axis parallel to the pivot axis, and an inertial sensor detecting an angular velocity about a roll axis orthogonal to the pivot axis and the linear motion axis or an acceleration in a tangential direction of a circle around the roll axis, including a control unit controlling the motor, wherein the control unit controls the motor based on information representing a pivot direction of the arm about the roll axis when the arm stops or decelerates and output from the inertial sensor.

In the above described control apparatus, the information may be obtained based on the output from the inertial sensor.

In the above described control apparatus, the control unit may have a memory unit, and the information may be stored in the memory unit.

In the above described control apparatus, the information may have first information representing the pivot direction when the shaft is located in a first position and second information representing the pivot direction when the shaft is located in a second position higher than the first position.

In the above described control apparatus, the control unit may control the motor without using the information when the shaft is located between the first position and the second position.

In the above described control apparatus, the shaft may be provided with a load, and the information may be based on a weight of the load.

A control method according to this application is a control method for a robot having an arm pivoting about a pivot axis by a motor, a shaft coupled to the arm and moving in an axial direction of a linear motion axis parallel to the pivot axis, and an inertial sensor, including a detection step of detecting an angular velocity about a roll axis orthogonal to the pivot axis and the linear motion axis or an acceleration in a tangential direction of a circle around the roll axis by the inertial sensor, and a control step of controlling the motor based on the detected angular velocity or acceleration and information representing a pivot direction of the arm about the roll axis when the arm stops or decelerates.

In the above described control method, the information may be obtained based on the output from the inertial sensor.

In the above described control method, the information may be stored information.

In the above described control method, the information may have first information representing the pivot direction when the shaft is located in a first position and second information representing the pivot direction when the shaft is located in a second position higher than the first position.

In the above described control method, the control step may include a step of controlling the motor without using the information when the shaft is located between the first position and the second position.

In the above described control method, the shaft may be provided with a load, and the information may be based on a weight of the load.

BRIEF DESCRIPTION OF THE DRAWINGS

FIG. 5A is a view as seen in a direction of an arrow Q2 in FIG. 1 for explanation of action steps of an arm.

FIG. 5B is a view as seen in a direction of an arrow Q1 in FIG. 1 for explanation of the action steps of the arm.

DESCRIPTION OF EXEMPLARY EMBODIMENTS

As below, a robot system, control apparatus, and control method of the present disclosure will be explained in detail based on preferred embodiments shown in the accompanying drawings. The following embodiments do not unduly limit the details of the present disclosure described in the appended claims. Further, not all configurations described in the embodiments are essential component elements of the present disclosure.

In FIGS. 1, 2, 5A, 5B, 6, 7A, 7B, and 10 of the drawings referred to as below, for convenience of explanation, an X-axis, a Y-axis, and a Z-axis as three axes orthogonal to one another are shown by arrows, and the head sides of the arrows are referred to as "+(plus)" and tail sides are referred to as "− (minus)". Further, hereinafter, directions parallel to the X-axis are referred to as "X-directions", directions parallel to the Y-axis are referred to as "Y-directions", and directions parallel to the Z-axis are referred to as "Z-directions". Furthermore, hereinafter, for convenience of explanation, the +Z-direction side as the upside in FIG. 1 may be referred to as "upper" and the −Z-direction side as the downside may be referred to as "lower".

As below, the XY-plane containing the X-axis and the Y-axis is horizontal and the Z-axis is along the vertical direction. Here, "horizontal" in this specification is not limited to the completely horizontal state, but includes states with inclinations within e.g. 5° relative to the horizontal state unless conveyance of electronic components is hindered. Similarly, in this specification, "vertical" is not limited to the completely vertical case, but includes cases with inclinations within e.g. ±5° relative to the vertical case. Further, in this specification, "parallel" includes not only the case where two lines (including axes) or surfaces are completely parallel to each other, but includes cases with inclinations within e.g. ±10°. Furthermore, in this specification, "orthogonal" includes not only the case where two lines (including axes) or surfaces are completely orthogonal to each other, but includes cases with inclinations within e.g. ±10°.

Figure 1:
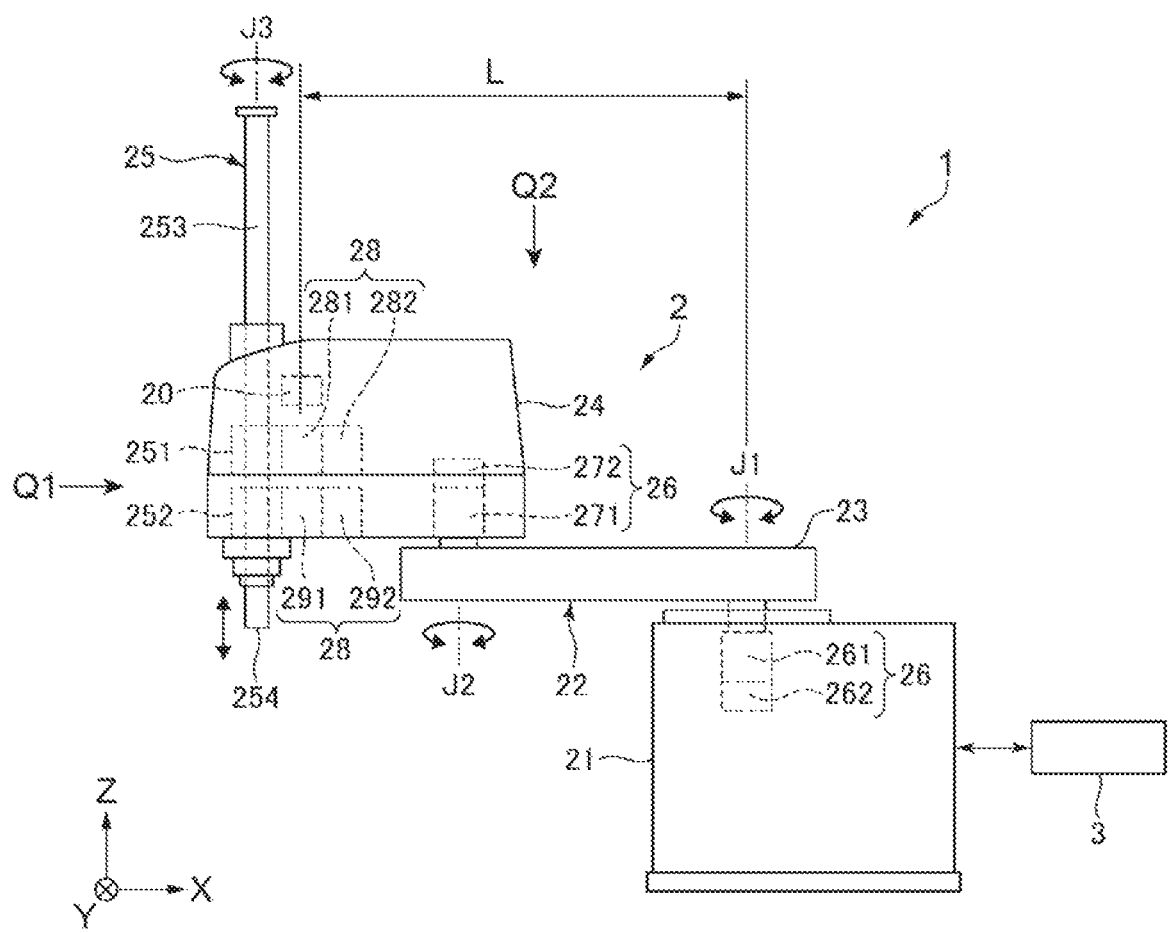
FIG. 1 shows an overall configuration of a robot system according to a first embodiment.
Figure 2:
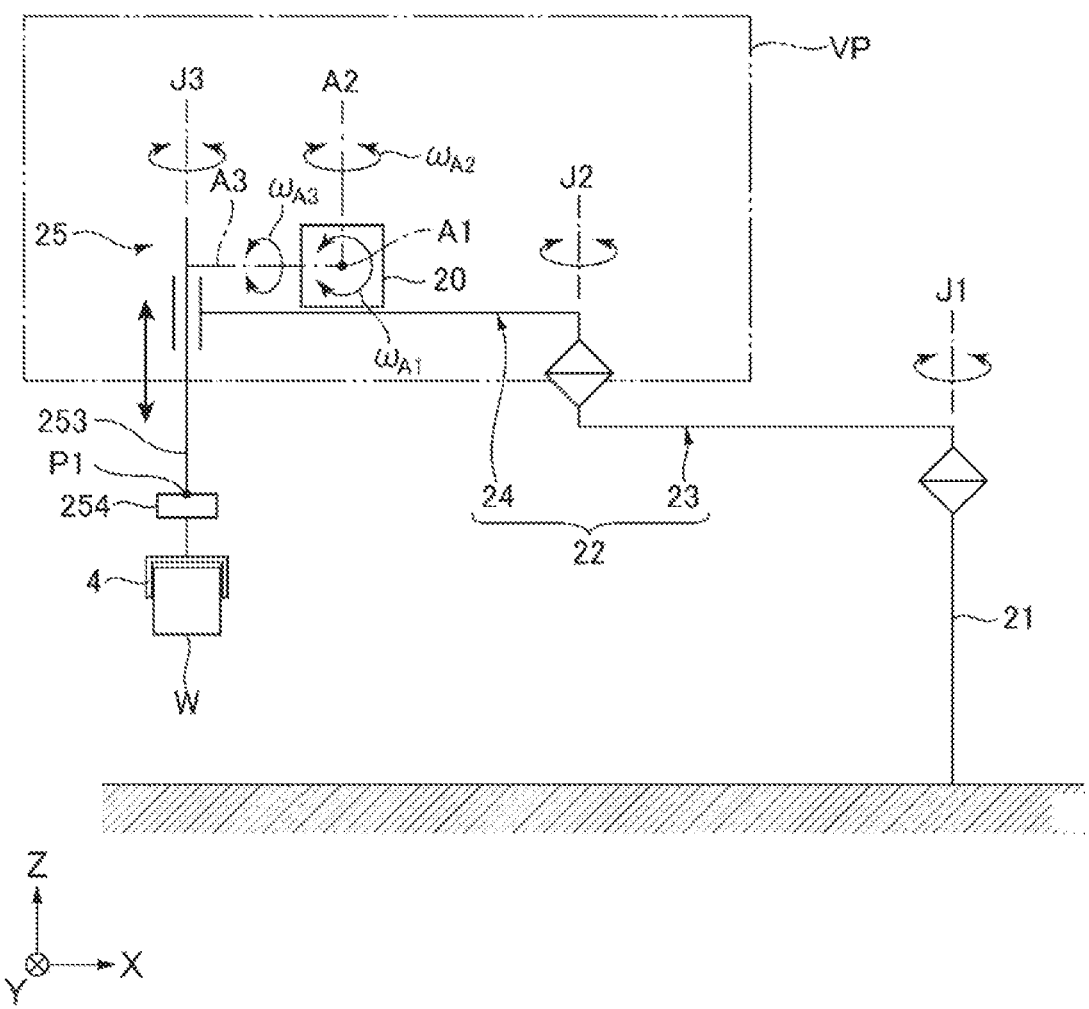
FIG. 2 is a schematic diagram of a robot applied to the robot system according to the first embodiment.

1. First Embodiment 1.1: Overall Configuration of Robot System According to First Embodiment First, the configuration of the robot system according to the first embodiment will be explained with reference to FIGS. 1, 2, and 3. FIG. 1 shows the overall configuration of the robot system according to the first embodiment. FIG. 2 is the schematic diagram of the robot applied to the robot system according to the first embodiment. Note that the illustration of an end effector is omitted in FIG. 1. Further, FIG. 2 schematically shows the end effector and an object.

As shown in FIGS. 1 and 2, a robot system 1 according to the first embodiment includes a robot 2 and a control apparatus 3 controlling the robot 2. Thereby, the robot system 1 may have advantages of the control apparatus 3 to be described later. The usage of the robot system 1 is not particularly limited, but the robot system may be used for respective work including e.g. holding, conveyance, assembly, inspection, etc. of objects such as electronic components and electronic apparatuses.

The robot 2 is a horizontal articulated robot also called a scalar robot, and has a base 21, an arm 22 provided on the base 21 and being pivotable about a first pivot axis J1 as a pivot axis relative to the base 21, and a working head 25 provided in the arm 22. Further, the robot 2 has an arm drive unit 26 that drives the arm 22 about a second pivot axis J2 as a pivot axis, and a working head drive unit 28 that drives the working head 25. Furthermore, the robot 2 has a spline shaft 253 as a shaft provided in a different position from that of the second pivot axis J2, moving in an axial direction of a linear motion axis parallel to one of the first pivot axis J1 and the second pivot axis J2 in the working head 25, and provided with an end effector 4 at lower one end side thereof, and an angular velocity sensor 201 (see FIG. 3) as an example of an inertial sensor 20 provided in the arm 22 or the spline shaft 253 and detecting an angular velocity ωA3 about a third angular velocity detection axis A3 as an axis parallel to a virtual plane VP as a plane being orthogonal to the axial direction of the second pivot axis J2 and containing a third pivot axis J3 as a pivot axis of the spline shaft 253 and a roll axis of the arm 22.

Figure 3:
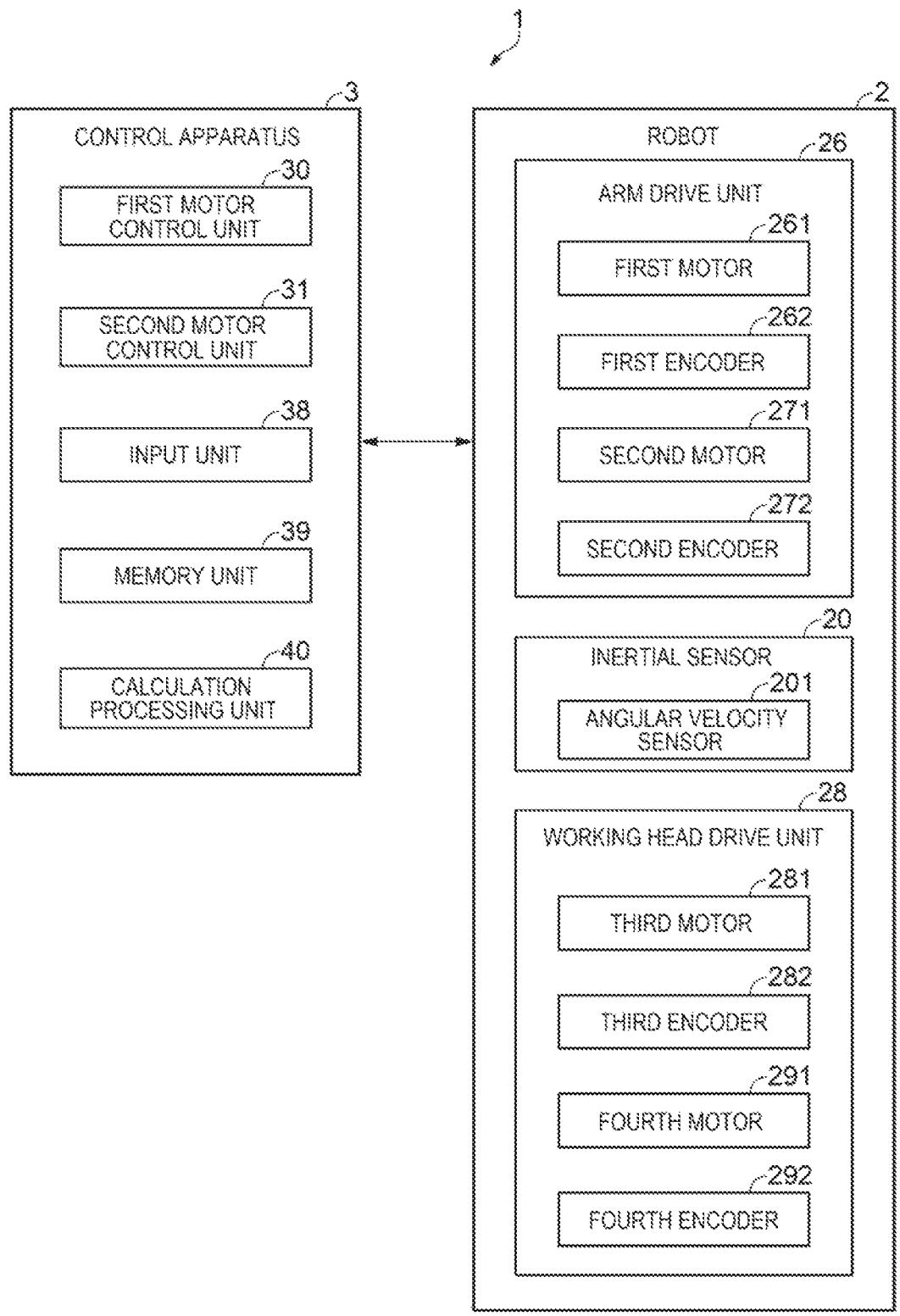
FIG. 3 is a block diagram showing a control system of the robot system according to the first embodiment.

The control apparatus 3 includes a first motor control unit 30 that controls actuation of a first motor 261 as a motor and a second motor control unit 31 that controls actuation of a second motor 271 as a motor contained in the arm drive unit 26 (see FIG. 3). When the arm 22 pivots about the second pivot axis J2, the first motor control unit 30 performs feedback control on the first motor 261 based on the angular velocity ωA3 detected by the angular velocity sensor 201. The first motor control unit controls the actuation of the first motor 261 by the feedback control, and thereby, may suppress vibration such as pivot generated along the pivot direction of the arm 22 in the spline shaft 253 of the working head 25, e.g. vibration of a control point P1 at the end effector 4 side generated in the spline shaft 253.

According to the robot system 1, as will be described later, the vibration of the arm 22 after the arm 22 pivots about the first pivot axis J1 and stops or when the arm decelerates may be suppressed, and e.g. the position of the control point P1 of the spline shaft 253 may be maintained as fixed as possible. Thereby, when an object W is gripped by the end effector 4, the gripping may be stably performed.

As below, the configuration of the robot 2 will be explained further in detail.

The base 21 is fixed to e.g. a floor surface (not shown) by bolts or the like. The arm 22 has a first arm 23 coupled to the base 21 and being pivotable about the first pivot axis J1 relative to the base 21, and a second arm 24 provided in the distal end portion of the first arm 23 and pivotably coupled about the second pivot axis J2 parallel to the first pivot axis J1 relative to the first arm 23.

Note that it is preferable that the first arm 23 contains a member having flexibility of e.g. a resin or the like in a member forming the outer surface thereof. As the resin, e.g. thermoplastic resin including polyvinyl chloride and polyethylene, thermosetting resin including phenol resin and melamine resin, natural rubber, synthetic rubber, or the like may be exemplified. A resin or the like is used for the outer surface of the first arm 23, and thereby, contact impact when the pivoting first arm 23 comes into contact with another part may be reduced by buffer action due to flexibility of the resin. Note that the arm 22 performs feedback control on the first motor 261 based on the angular velocity ωA3 detected by the angular velocity sensor 201 to control the actuation of the first motor 261, and thereby, may suppress vibration generated in the spline shaft 253 of the working head 25. Therefore, as described above, the arm 22 even with the first arm 23 having the outer surface formed by a soft resin does not increase the vibration generated in the spline shaft 253 of the working head 25.

The first motor 261 that pivots the first arm 23 about the first pivot axis J1 as the pivot axis thereof relative to the base 21 is provided within the base 21. Further, a first encoder 262 as an angle sensor that detects an amount of rotation of the first motor 261 is provided in the first motor 261, and a pivot angle of the first arm 23 relative to the base 21 may be detected by the output from the first encoder 262.

The second motor 271 that pivots the second arm 24 about the second pivot axis J2 as the pivot axis thereof relative to the first arm 23 is provided within the second arm 24. Further, a second encoder 272 as an angle sensor that detects an amount of rotation of the second motor 271 is provided in the second motor 271, and a pivot angle of the second arm 24 relative to the first arm 23 may be detected by the output from the second encoder 272. As shown in FIG. 3, the arm drive unit 26 has the first motor 261, the first encoder 262, the second motor 271, and the second encoder 272.

The working head 25 is provided in a distal end portion of the second arm 24, i.e., in a different position from that of the second pivot axis J2 as the pivot axis of the second arm 24. The working head 25 has a spline nut 251 and a ball screw nut 252 coaxially placed in the distal end portion of the second arm 24, and the spline shaft 253 inserted through the spline nut 251 and the ball screw nut 252.

The spline shaft 253 is pivotable about the third pivot axis J3 as the center axis thereof and reciprocable in directions along the third pivot axis J3, in other words, directions parallel to the third pivot axis J3 relative to the second arm 24. Note that the first pivot axis J1, the second pivot axis J2, and the third pivot axis J3 are parallel to one another and respectively along the vertical direction.

Further, a third motor 281 that rotates the spline nut 251 to rotate the spline shaft 253 about the third pivot axis J3 is provided within the second arm 24. A third encoder 282 as an angle sensor that detects an amount of rotation of the third motor 281 is provided in the third motor 281, and an amount of rotation of the spline shaft 253 relative to the second arm 24 may be detected by the output from the third encoder 282. Furthermore, a fourth motor 291 that rotates the ball screw nut 252 to move the spline shaft 253 in the direction along the third pivot axis J3 is provided within the second arm 24. A fourth encoder 292 as an angle sensor that detects an amount of rotation of the fourth motor 291 is provided in the fourth motor 291, and an amount of movement of the spline shaft 253 relative to the second arm 24 may be detected by the output from the fourth encoder 292. As shown in FIG. 3, the working head drive unit 28 has the third motor 281, the third encoder 282, the fourth motor 291, and the fourth encoder 292.

As shown in FIGS. 1 and 2, a payload 254 for attachment of the end effector 4 is provided in the end portion at the lower end side of the spline shaft 253. The end effector 4 to be attached to the payload 254 is not particularly limited to, but includes e.g. a hand holding the object W and a working tool for processing the object W. Note that the holding of the object W with the hand includes gripping and suction.

The angular velocity sensor 201 (see FIG. 3) as the example of the inertial sensor 20 is provided within the second arm 24. Particularly, the angular velocity sensor 201 in the embodiment is provided near the spline shaft 253 as the distal end portion of the second arm 24. Note that a distance between the first pivot axis J1 and the inertial sensor 20, in the configuration, a distance between the first pivot axis J1 and the angular velocity sensor 201 is referred to as "distance L".

As described above, the angular velocity sensor 201 is provided in the distal end portion of the second arm 24 and the distance L between the first motor 261 and the angular velocity sensor 201 is larger, and thereby, the vibration about the third angular velocity detection axis A3 as the roll axis of the second arm 24 may be detected in a part in which the vibration is larger and the detection sensitivity of the angular velocity ωA3 may be improved.

As shown in FIG. 2, when the first arm 23 pivots about the first pivot axis J1 during pivot of the second arm 24 about the second pivot axis J2 or during stoppage of the pivot of the second arm 24, the angular velocity sensor 201 may detect angular velocities about three axes in the second arm 24. As below, "the angular velocity generated about the roll axis of the arm 22 when the first arm 23 pivots about the first pivot axis J1" will be representatively described.

Note that the first axis of the three axes is a first angular velocity detection axis A1 in FIG. 2, the second axis is a second angular velocity detection axis A2, and the third axis is the third angular velocity detection axis A3. It is preferable that the angular velocity sensor 201 is formed by e.g. a gyro sensor.

The first angular velocity detection axis A1 is an axis orthogonal to the virtual plane VP as a plane containing the second pivot axis J2 and the third pivot axis J3, i.e., the paper surface of FIG. 2 and along the Y-axis shown in FIG. 2. The angular velocity about the first angular velocity detection axis A1, in other words, the angular velocity in a pitch direction may be referred to as "first angular velocity ωA1".

The second angular velocity detection axis A2 is an axis orthogonal to the first angular velocity detection axis A1, that is, parallel to the axial direction of the second pivot axis J2 and along the Z-axis shown in FIG. 2. The angular velocity about the second angular velocity detection axis A2, in other words, the angular velocity in a yaw direction may be referred to as "second angular velocity ωA2".

The third angular velocity detection axis A3 is an axis orthogonal to the first angular velocity detection axis A1 and the second angular velocity detection axis A2, that is, orthogonal to the axial direction of the second pivot axis J2, parallel to the virtual plane VP, and along the X-axis shown in FIG. 2. The angular velocity about the third angular velocity detection axis A3, in other words, the angular velocity of the arm 22 in a roll direction may be referred to as "third angular velocity ωA3".

As described above, the angular velocity sensor 201 may detect the first angular velocity ωA1 about the first angular velocity detection axis A1 orthogonal to the virtual plane VP. Thereby, for example, information of the first angular velocity ωA1 may be used for vibration suppression control of the spline shaft 253 in the upward and downward directions along the Z-axis.

Further, the angular velocity sensor 201 may also detect the second angular velocity ωA2 about the second angular velocity detection axis A2 parallel to the second pivot axis J2. Thereby, for example, information of the second angular velocity ωA2 may be used for vibration suppression control of the spline shaft 253 in the horizontal directions.

Furthermore, the angular velocity sensor 201 may detect the third angular velocity ωA3 about the third angular velocity detection axis A3 parallel to the roll axis of the arm 22. The third angular velocity ωA3 is used for vibration suppression control of the spline shaft 253 about the third angular velocity detection axis A3. This control will be described later.

The angular velocity sensor 201 is not particularly limited as long as the sensor may detect an angular velocity. For example, an angular velocity sensor that detects an angular velocity from electric charge generated due to deformation of a piezoelectric material, an angular velocity sensor that detects an angular velocity from a change in capacitance, or the like may be used. Note that, in the embodiment, a quartz crystal vibrator is used as the angular velocity sensor 201. The quartz crystal vibrator has a vibrating arm, and, when an angular velocity about one detection axis of the first angular velocity detection axis A1, the second angular velocity detection axis A2, and the third angular velocity detection axis A3 is applied during vibration of the vibrating arm in a drive vibration mode, a detection vibration mode is excited in the vibration arm due to Coriolis force and a detection signal according to the detection vibration mode is output. Accordingly, the angular velocity about each detection axis may be detected based on the detection signal output from the quartz crystal vibrator.

As shown in FIG. 3, the control apparatus 3 has the first motor control unit 30 and the second motor control unit 31 electrically coupled to the arm drive unit 26, the working head drive unit 28, and the inertial sensor 20 of the robot 2, and controlling actuation of these respective units. The robot 2 and the control apparatus 3 are electrically coupled by a cable. Note that, for example, the robot 2 and the control apparatus 3 may be coupled in wireless connection without the cable, not in wired connection. Further, a part or all of the control apparatus 3 may be provided inside of the robot 2.

The control apparatus 3 including the first motor control unit 30 and the second motor control unit 31 may be formed by e.g. a computer (PC: personal computer) with a CPU (Central Processing Unit) as an example of a processor built therein or the like. Thereby, the control apparatus 3 may control the respective parts of the robot 2.

Further, as shown in FIG. 3, the control apparatus 3 includes a memory unit 39 that stores various kinds of information (various conditions) and an input unit 38 for inputting various kinds of information (various conditions).

In the memory unit 39, e.g. programs for moving the robot 2, a control program for feedback control on the first motor 261 based on a correction sign as information representing the pivot direction of the arm 22 about the roll axis and the angular velocity ωA3 detected by the angular velocity sensor 201 when the arm 22 pivots about the second pivot axis J2, information input via the input unit 38, defined sensitivity correction amounts, etc. may be stored. Further, in the memory unit 39, information including a correction sign indicating the pivot direction of the arm 22 about the third angular velocity detection axis A3, i.e., in the roll direction, which will be described later, may be stored.

The input unit 38 may input information necessary for actions of the robot 2. The input unit 38 is not particularly limited to, but includes e.g. a keyboard, touch panel, or the like.

Figure 4:
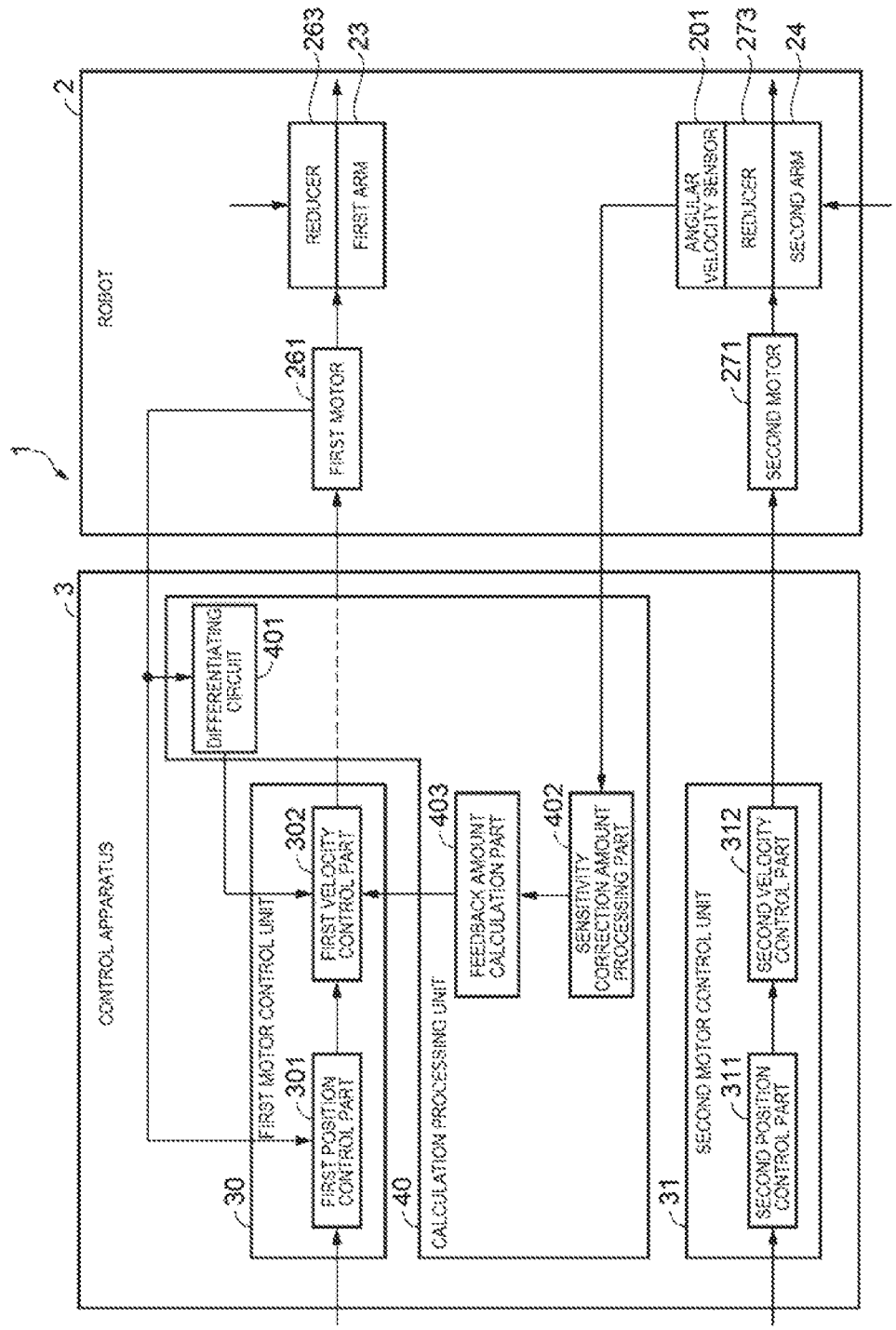
FIG. 4 is a block diagram showing a circuit system of the robot system according to the first embodiment.
Figure 6:
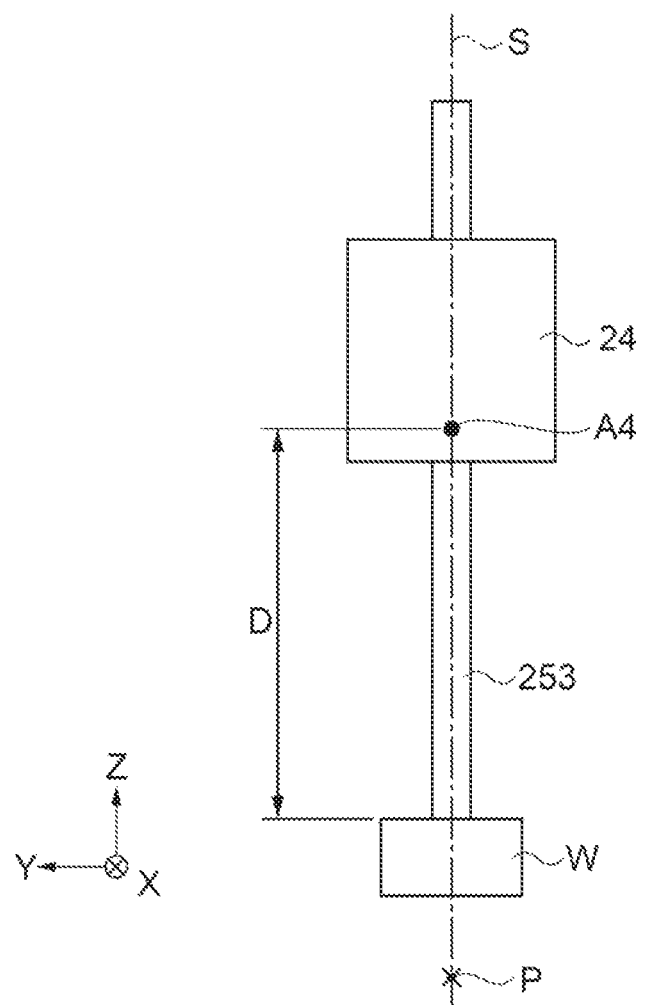
FIG. 6 is a schematic diagram for explanation of a second arm and a spline shaft.
Figure 7A:
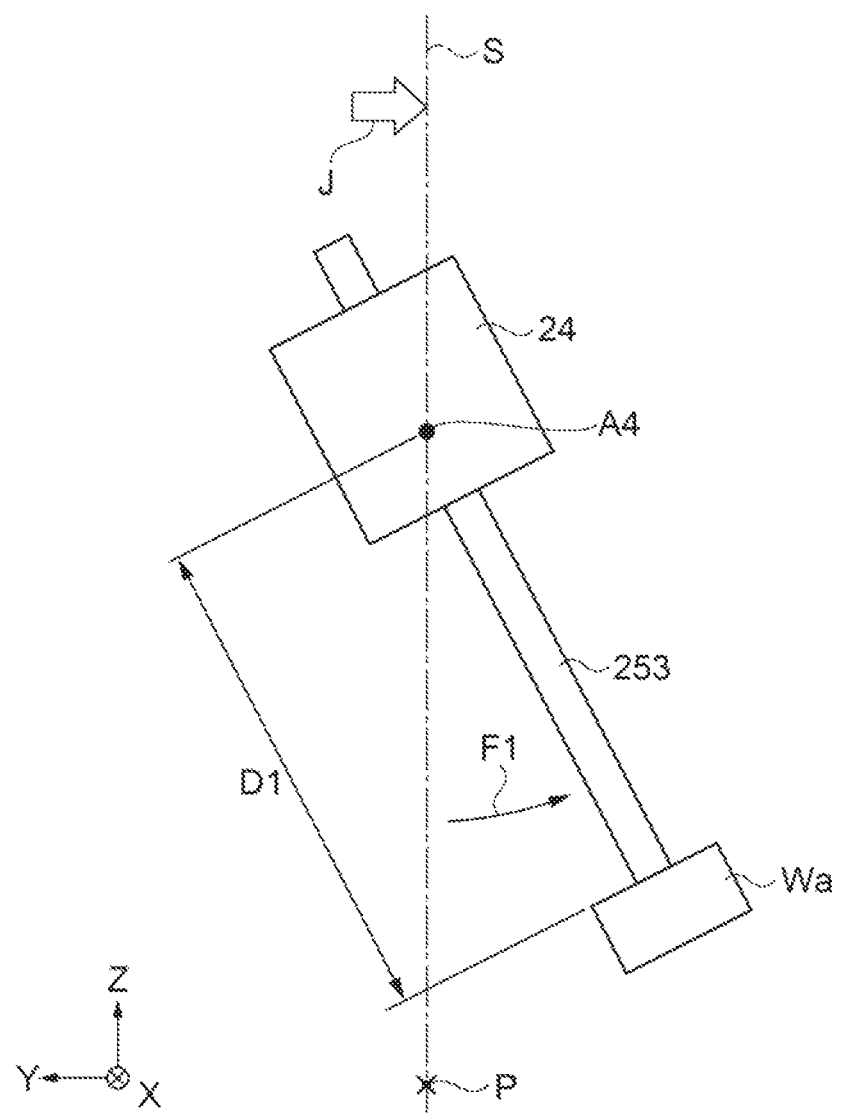
FIG. 7A is a schematic diagram showing rotational movement example 1 of the spline shaft in a roll direction when the arm stops or decelerates.
Figure 7B:
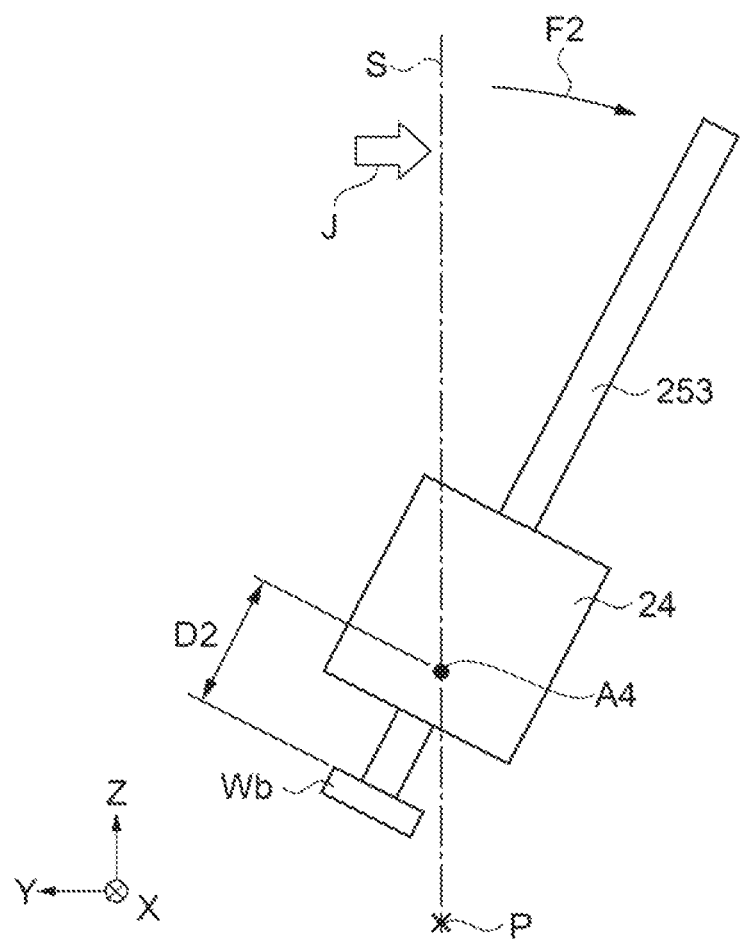
FIG. 7B is a schematic diagram showing rotational movement example 2 of the spline shaft in a roll direction when the arm stops or decelerates.
Figures 8, 9:
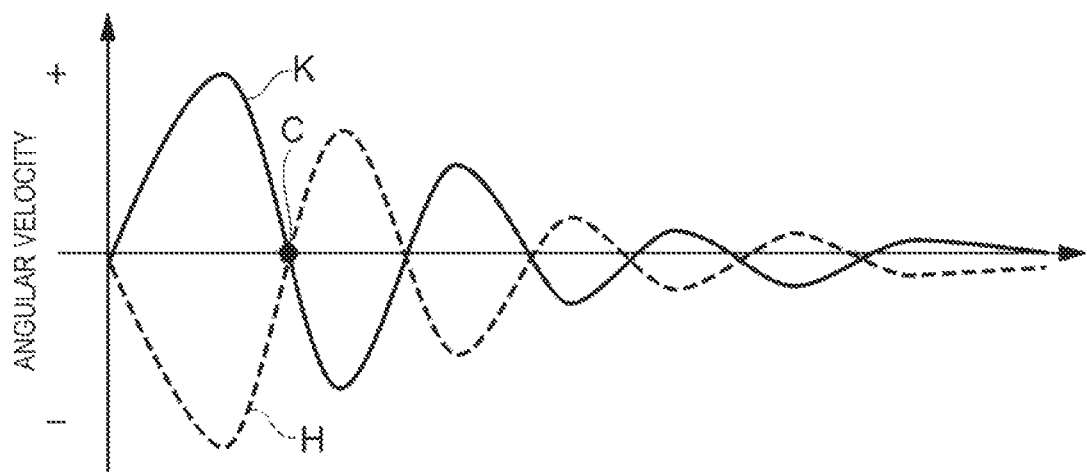
FIG. 8 shows an example of a sign table indicating twist directions depending on lengths of the spline shaft.
FIG. 9 is a graph showing angular velocities generated in the roll directions when the arm stops or decelerates.

1.2. Control Method and Control Apparatus for Suppression of Arm Vibration According to First Embodiment Next, a control method of suppressing the vibration of the spline shaft 253 about the third angular velocity detection axis A3 will be explained with reference to FIGS. 4A, 5A, 5B, 6, 7A, 7B, 8, and 9 in addition to FIGS. 1 to 3. FIG. 3 is the block diagram showing the control system of the robot system according to the first embodiment. FIG. 4 is the block diagram showing the circuit system of the robot system according to the first embodiment. FIG. 5A is the view as seen in the direction of the arrow Q2 in FIG. 1 for explanation of action steps of the arm. FIG. 5B is the view as seen in the direction of the arrow Q1 in FIG. 1 for explanation of the action steps of the arm. FIG. 6 is the schematic diagram for explanation of the second arm and the spline shaft. FIG. 7A is the schematic diagram showing the rotational movement example 1 of the spline shaft in the roll direction when the arm stops or decelerates. FIG. 7B is the schematic diagram showing rotational movement example 2 of the spline shaft in the roll direction when the arm stops or decelerates. FIG. 8 shows the example of the sign table indicating twist directions depending on lengths of the spline shaft. FIG. 9 is the graph showing angular velocities generated in the roll directions when the arm stops or decelerates.

Note that the control method of suppressing the vibration of the arm in the embodiment to be described includes a detection step of detecting the angular velocity ωA3 about the roll axis of the arm 22 by the angular velocity sensor 201 as the example of the inertial sensor 20 and a control step of controlling the first motor 261 based on the angular velocity detected by the angular velocity sensor 201 and the information representing the pivot direction of the arm 22 about the roll axis when the arm 22 stops or decelerates.

The arm 22 including the first arm 23 and the second arm 24 pivots from an initial position shown in Step 1 in FIG. 5A to a predetermined angle about the first pivot axis J1 shown by an arrow a1 and, when stopping in a position of an arm 22a shown by dashed-two dotted lines, vibrates about the third angular velocity detection axis A3, i.e., in the roll direction of the arm 22 due to the inertia thereof. Step 2 in FIG. 5A shows the state of stoppage. Then, as shown in Step 2A and Step 2B in FIG. 5B, the spline shaft 253 provided in the distal end portion of the second arm 24 forming the arm 22 also vibrates about the third angular velocity detection axis A3 together with the second arm 24, for example, between a spline shaft 253a and a spline shaft 253aa as shown by an arrow b1. Note that, in FIG. 5B, a stop target position of the spline shaft 253 is shown by a position P. In the angular velocity sensor 201, the angular velocity ωA3 equal to the vibration about the third angular velocity detection axis A3 may be detected and this step corresponds to the detection step.

Here, regarding the pivot direction of the vibration of the spline shaft 253 provided in the distal end portion of the second arm 24, there are a vibration example showing forward rotation as shown by the arrow b1 in FIG. 5B and a vibration example showing backward rotation of rotational vibration in an opposite direction to the arrow b1. In the feedback control to be described later, as information representing the pivot direction of the vibration of the spline shaft 253 provided in the distal end portion of the second arm 24, a correction sign indicating forward rotation or backward rotation is determined by one of methods to be described later. Then, at the control step, the control apparatus 3 controls the actuation of the first motor 261 based on the correction sign as the information representing the pivot direction of the arm 22 about the third angular velocity detection axis A3 and the output relating to the angular velocity ωA3 from the angular velocity sensor 201, and thereby, may suppress the vibration of the spline shaft 253 more properly.

The pivot direction of the vibration of the spline shaft 253 provided in the distal end portion of the second arm 24 is determined by a magnitude relationship between twist-direction moment Mj2 of the arm 22 and load-side moment Mload formed by the spline shaft 253 when the object W is gripped. In other words, when the pivot of the arm 22 about the first pivot axis J1 stops, regarding the pivot direction of the twist of the arm 22 generated about the third angular velocity detection axis A3, as shown in FIG. 6, the forward and backward directions of the pivot are reversed depending on the position condition of the spline shaft 253 when the object W is gripped, i.e., a length D of the spline shaft 253. That is, the correction sign as the information representing the pivot direction of the vibration generated in the spline shaft 253 changes. The correction sign as the information representing the pivot direction of the vibration in the spline shaft 253 may be determined by various methods. The determined information representing the pivot direction of the vibration in the spline shaft 253 is stored in the memory unit 39.

First, a first method of determining the correction sign as the information representing the pivot direction is explained. The first method of determining the correction sign as the information representing the pivot direction is obtained from a theoretical value of the structure of the robot 2 including the first arm 23 and the second arm 24.

Specifically, in the first method, as described above, the correction sign as the information representing the pivot direction of the vibration in the spline shaft 253 may be obtained using the magnitude relationship between the twist-direction moment Mj2 of the arm 22 and the load-side moment Mload formed by the spline shaft 253 as the shaft when the object W is gripped. Here, the twist-direction moment Mj2 of the arm 22 may be obtained from the theoretical value of the structure of the robot 2 including the first arm 23 and the second arm 24. The twist-direction moment Mj2 of the arm 22 is obtained in advance as the twist-direction moment Mj2 of the arm 22 as a theoretical value of moment as seen from a coupling support A4 of the first arm 23 and the second arm 24. To the twist-direction moment Mj2 of the arm 22, the moment may be obtained by comparison of the load-side moment Mload obtained by multiplication of the length D of the spline shaft 253 as seen from the coupling support A4 of the first arm 23 and the second arm 24 by a weight of a load when the object W is gripped.

As below, the correction sign as the sign indicating the pivot direction of the vibration in the spline shaft 253 will be explained with reference to FIGS. 7A and 7B.

First, referring to FIG. 7A, the case where the twist-direction moment Mj2 of the arm 22 is smaller than the load-side moment Mload expressed by multiplication of a length D1 of the spline shaft 253 by an object Wa, in other words, the case where the center of gravity of the load is largely apart toward the object W side with respect to the third angular velocity detection axis A3 is explained. In this case, as shown by rotational movement example 1 in FIG. 7A, the second arm 24 moved in a direction of an arrow J stops in a position of an imaginary line S, the object Wa side rotationally moves, that is, pivots about the third angular velocity detection axis A3 along a rotation direction F1, the same direction as the direction of the arrow J in which the second arm 24 moved. The correction sign in the case of the rotational movement is "correction sign plus (+)".

Next, referring to FIG. 7B, the case where the twist-direction moment Mj2 of the arm 22 is larger than the load-side moment Mload expressed by multiplication of a length D2 of the spline shaft 253 by an object Wb, in other words, the case where the center of gravity of the load is located in a position closer to the third angular velocity detection axis A3 is explained. In this case, as shown by rotational movement example 2 in FIG. 7B, when the second arm 24 moved in the direction of the arrow J stops in the position of the imaginary line S, an opposite side to the side on which the object Wb is placed with respect to the third angular velocity detection axis A3 rotationally moves about the third angular velocity detection axis A3 along a rotation direction F2, the same direction as the direction of the arrow J in which the second arm 24 moved. In other words, the object Wb side rotationally moves, that is, pivots about the third angular velocity detection axis A3 in an opposite direction to the direction of the arrow J in which the second arm 24 moved, that is, in an opposite direction to the direction shown in FIG. 7A. The correction sign in the case of the rotational movement is "correction sign minus (−)".

Returning to FIGS. 5A and 5B, when the second arm forming the arm 22 vibrates about the third angular velocity detection axis A3, the larger the vibration, the larger the amplitude at the control point P1, in other words, the amount of displacement at the control point P1. As a result, it may be possible that the position of the control point P1 is not determined (see FIG. 5B: Step 2B). In this state, for example, to grip the object W by the end effector 4, the gripping may be difficult.

Accordingly, in the control apparatus 3, the feedback control is performed on the first motor 261 based on the correction sign as the information representing the pivot direction of the arm 22 about the roll axis and the angular velocity ωA3 about the roll axis of the arm 22 detected by the angular velocity sensor 201 to control the actuation of the first motor 261, and thereby, the vibration of the spline shaft 253 about the third angular velocity detection axis A3, that is, about the roll axis is suppressed.

In the feedback control, the actuation of the first motor 261 is controlled so that the arm 22 may move based on the correction sign as the information representing the pivot direction of the arm 22 about the roll axis and the direction and the magnitude of the angular velocity ωA3 about the roll axis of the arm 22 detected by the angular velocity sensor 201 in a direction in which the angular velocity ωA3 is cancelled out. That is, the control apparatus 3 controls the actuation of the first motor 261 as velocity control and moves the arm 22a in a direction shown by an arrow a2 in Step 3 in FIG. 5A and Step 3 in FIG. 5B, and thereby, cancels out the angular velocity ωA3. As a result, the spline shaft 253a provided in the distal end portion of the second arm 24a is located in a position of a spline shaft 253b of a second arm 24b shown in Step 3 in FIG. 5A and Step 3 in FIG. 5B.

Then, the control apparatus 3 controls the actuation of the first motor 261 as position control of the arm 22, moves an arm 22b to a position of an arm 22c in a direction shown by an arrow a3 in Step 4 in FIG. 5A and Step 4 in FIG. 5B, and stops a spline shaft 253c in the position P as the stop target position. As described above, the control apparatus 3 is configured to control so that the stop position of the control point P1 may be kept as fixed as possible by suppression of the vibration of the arm 22, i.e., the spline shaft 253.

Note that the above described determination of the correction sign as the information representing the pivot direction of the arm 22 about the roll axis may be performed using the following second method and third method.

The second method of determining the correction sign as the information representing the pivot direction determines the correction sign based on the output from the angular velocity sensor 201 as the inertial sensor 20. A hand as a gripping device or peripheral device may be attached to the arm 22. In this case, the twist-direction moment Mj2 of the arm 22 deviates from the theoretical value of the design structure of the robot 2.

In the second method, to obtain the twist pivot direction of the arm 22 corresponding to the deviated twist-direction moment Mj2 of the arm 22, with the hand or peripheral device attached to the arm 22, the twist pivot direction when the arm 22 stops is acquired in correspondence with the length D of the spline shaft 253 as the shaft.

For acquisition of the twist pivot direction, a sign of the output from the angular velocity sensor 201 when the arm 22 stops is acquired, and the twist pivot direction is determined based on the sign of the output. In the second method, the case where the angular velocity when the pivot of the arm 22 stops is clockwise is defined as "correction sign plus (+)" and the case where the angular velocity is counterclockwise is defined as "correction sign minus (−)".

Specifically, whether the first twist pivot direction when the length D of the spline shaft 253 is changed, for example, at fixed intervals and the arm 22 is pivoted and stopped at each time is "correction sign plus (+)" or "correction sign minus (−)" is recorded, and a table shown in FIG. 8 is created. The example shown in the table of FIG. 8 shows correction signs when a spline length as the length of the spline shaft 253 is changed from 0 mm to 180 mm at intervals of 10 mm.

Further, specifically, the example shown in the table of FIG. 8 includes the correction signs "minus" as first information representing the twist pivot direction when the spline shaft 253 is located in a first position where the spline length as the length of the spline shaft 253 is from 0 mm to 160 mm and the correction signs "plus" as second information representing the twist pivot direction when the spline shaft 253 is located in a second position where the spline length as the length of the spline shaft 253 is from 170 mm to 180 mm. That is, the information representing the pivot direction of the vibration has the first information representing the twist pivot direction when the spline shaft 253 is located in the first position and the second information representing the twist pivot direction when the spline shaft 253 is located in the second position higher than the first position. The information representing the pivot direction of the vibration in the spline shaft 253 is stored in the memory unit 39.

When the robot 2 is used in practice, the correction sign is determined according to the length D of the spline shaft 253 when the robot stops, for example, whether the spline length is in the first position or the second position, and the actuation of the first motor 261 is controlled based on the determined correction sign and the output relating to the angular velocity ωA3 from the angular velocity sensor 201. Thereby, the vibration of the spline shaft 253 may be suppressed more properly.

Note that, in the second method, when there is an area where no twist pivot occurs because the twist-direction moment Mj2 of the arm 22 and the load-side moment Mload are balanced or there is an area where the correction sign may vary, the actuation of the first motor 261 may be controlled without using the correction sign. That is, at the control step, an area between the correction sign "minus" as the first information representing the twist pivot direction when the spline length as the length of the spline shaft 253 is located in the first position and the correction sign "plus" as the second information representing the twist pivot direction when the spline length is located in the second position is referred to as "dead-band area", and the dead-band area may include a step of controlling the actuation of the first motor 261 without using the correction sign.

In the example shown in the table of FIG. 8, when the spline shaft 253 is located between the first position and the second position where the spline length is within a range longer than 160 mm and shorter than 170 mm, the twist-direction moment Mj2 of the arm 22 and the load-side moment Mload may be balanced and no twist pivot may occur. Or, the correction sign may be unstable to be "plus" or "minus". Therefore, when the spline shaft 253 is located within the range longer than 160 mm and shorter than 170 mm, this area is regarded as the dead-band area and the actuation of the first motor 261 is controlled based on the output relating to the angular velocity ωA3 from the angular velocity sensor 201 without correction.

As described above, the control apparatus 3 controls the actuation of the first motor 261 based on the output relating to the angular velocity ωA3 from the angular velocity sensor 201 without using the correction sign in the dead-band area where the spline shaft 253 is located between the first position and the second position where no twist pivot of the spline shaft 253 occurs, and thereby, stable feedback control may be performed.

The third method of determining the correction sign as the information representing the pivot direction determines the correction sign based on the output from the angular velocity sensor 201 as the inertial sensor 20. In the third method, when whether the angular velocity when the pivot of the arm 22 stops starts in a clockwise direction defined as a plus direction or starts in a counterclockwise direction defined as a minus direction is unclear, control is performed using an absolute value of angular velocity data immediately after the pivot of the arm 22 stops.

Specifically, in the third method, as shown in FIG. 9, whether or not the sign of the angular velocity data after a zero-cross point C is inverted is determined depending on the sign of the angular velocity data from immediately after the pivot of the arm 22 stops to the zero-cross point C at which the sign of the output angular velocity data is inverted. For example, when the original angular velocity data when the arm 22 stops transitions in a waveform like a broken line H, absolute values of the angular velocity data to the zero-cross point C form a waveform shown by a solid line K. In this regard, the sign of the angular velocity data to the zero-cross point C is minus, and the sign of the angular velocity data shown by the broken line H after the zero-cross point C is inverted. As a result, the angular velocity data shown by the broken line H is inverted with sign into the waveform shown by the solid line K. The angular velocity data with the inverted sign is used, and thereby, feedback control can be performed in a case where the direction of the angular velocity is unclear when the pivot of the arm 22 stops.

Note that the control apparatus 3 may perform velocity control of controlling the actuation of the first motor 261 so that the arm 22 may move based on the angular velocity ωA3 in a direction in which the angular velocity ωA3 is cancelled out and position control of predicting displacement generated by the velocity control and moving the arm 22 to a target position in parallel as feedback control.

As the above described configurations, as shown in FIG. 4, the control apparatus 3 has the first motor control unit 30, the second motor control unit 31, a differentiating circuit 401, a sensitivity correction amount processing part 402, and a feedback amount calculation part 403.

The first motor control unit 30 includes a first position control part 301 as a position control part and a first velocity control part 302 as a velocity control part, and controls the actuation of the first motor 261 that pivots the first arm 23 about the first pivot axis J1. Further, the first motor control unit 30 performs the feedback control on the first motor 261 based on the correction sign as the information representing the pivot direction of the arm 22 about the roll axis and the angular velocity ωA3 detected by the angular velocity sensor 201 when the arm 22 pivots about the second pivot axis J2. Here, the first motor 261 may pivot the first arm 23 via a reducer 263 by actuation control by the first motor control unit 30.

Specifically, the first velocity control part 302 controls the actuation of the first motor 261 so that the arm 22 may move based on the correction sign as the information representing the pivot direction of the arm 22 about the roll axis and the direction and the magnitude of the angular velocity ωA3 about the roll axis of the arm 22 detected by the angular velocity sensor 201 in a direction in which the angular velocity ωA3 is cancelled out. That is, the control apparatus 3 controls the actuation of the first motor 261 as velocity control and moves the arm 22 in a direction in which the angular velocity ωA3 is generated, and thereby, cancels out the angular velocity ωA3 and reduces the angular velocity ωA3.

Then, the first position control part 301 performs position control of returning to the target position by the distance of the movement by the first velocity control part 302 for cancelling out the angular velocity ωA3 and reducing the angular velocity ωA3. Thereby, the distal end portion of the second arm 24, in other words, the spline shaft 253 is moved to the target position.

In the above described manner, the first velocity control part 302 controls the velocity of the first motor 261 based on the correction sign as the information representing the pivot direction of the arm 22 about the roll axis and the output from the angular velocity sensor 201 to suppress the vibration of the second arm 24 about the roll axis due to the angular velocity ωA3, and the first position control part 301 moves the arm to the target position by the amount of displacement due to the vibration by position control. Thereby, the distal end portion of the second arm 24 may be brought to the target position more accurately in a shorter time.

The first position control part 301 is a part that generates a velocity command to the first motor 261 to pivot the first arm 23 about the first pivot axis J1 based on e.g. a position command stored in the memory unit 39 in advance.

The first velocity control part 302 is a part that generates a current command to drive the first motor 261 based on the velocity command generated in the first position control part 301.

The second motor control unit 31 includes a second position control part 311 as a position control part and a second velocity control part 312 as a velocity control part, and controls the actuation of the second motor 271 that pivots the second arm 24 about the first pivot axis J1. Here, the second motor 271 may pivot the second arm 24 via a reducer 273 by actuation control by the second motor control unit 31.

The second position control part 311 is a part that generates a velocity command to the second motor 271 to pivot the second arm 24 about the second pivot axis J2 based on e.g. a position command stored in the memory unit 39 in advance.

The second velocity control part 312 is a part that generates a current command to drive the second motor 271 based on the velocity command generated in the second position control part 311.

The differentiating circuit 401 is a part that differentiates the pivot angle about the first pivot axis J1 of the first arm 23 obtained by the output from the second encoder 272. An angular velocity command as a command generated by the differentiation is input to the first velocity control part 302 and superimposed on the current command to drive the first motor 261.

The sensitivity correction amount processing part 402 performs processing of multiplying the angular velocity ωA3 detected by the angular velocity sensor 201 by a defined sensitivity correction amount to obtain a control amount usable for feedback control. As the processing, in the embodiment, the angular velocity ωA3 is multiplied by a coefficient k1. Note that the coefficient k1 is an arbitrary numeric value larger than zero. For example, when 0<k1<1, the angular velocity ωA3 is decreased in the sensitivity correction amount processing part 402. On the other hand, when the correction in the sensitivity correction amount processing part 402 is omitted, the angular velocity ωA3 having the unchanged magnitude, i.e., without being decreased is input to the feedback amount calculation part 403 and, as a result, smooth pivot of the first arm 23 about the first pivot axis J1 may be difficult.

The feedback amount calculation part 403 calculates an angular velocity feedback value from the control amount based on the angular velocity ωA3 processed in the sensitivity correction amount processing part 402 and sends the value to the first velocity control part 302. That is, feedback based on the angular velocity ωA3 detected by the angular velocity sensor 201 is not performed on the first position control part 301, but performed on the first velocity control part 302.

Note that the robot 2 may be affected by disturbance vibration due to the pivot of the first arm 23 about the first pivot axis J1 and the pivot of the second arm 24 about the second pivot axis J2.

In the control method of controlling the robot 2, by the feedback control based on the angular velocity ωA3 detected by the angular velocity sensor 201, the first motor 261 pivoting the first arm 23 is brought into a drive state according to the position command and the velocity command. In the drive state, the movement about the third angular velocity detection axis A3 of the spline shaft 253 provided in the distal end portion of the second arm 24 may be cancelled out and the vibration may be suppressed. Thereby, the position of the spline shaft 253 is determined in a shorter time.

According to the robot system 1 of the above described first embodiment, the first motor control unit 30 performs feedback control on the first motor 261 based on the correction sign as the information representing the pivot direction of the arm 22 about the roll axis and the angular velocity ωA3 of the arm 22 about the roll axis detected by the angular velocity sensor 201 as the example of the inertial sensor 20. The feedback control controls the actuation of the first motor 261 to suppress the vibration of the arm 22 about the roll axis generated in the spline shaft 253 provided in the distal end portion of the second arm 24, and thereby, may suppress the vibration of the spline shaft 253 provided in the distal end portion of the second arm 24 and determine the position of the spline shaft 253 in the shorter time.

Note that, in the above description, the configuration example in which the angular velocity sensor 201 is provided at the distal end portion side of the second arm 24 is shown for explanation, however, the placement position of the angular velocity sensor 201 is not limited to that. The angular velocity sensor 201 may be provided in e.g. the working head 25 or the spline shaft 253 or provided in the first arm 23. When the angular velocity sensor 201 is provided in the first arm 23, it is desirable that the angular velocity sensor 201 is provided in a position as far as possible from the first pivot axis J1 as the pivot axis of the first arm 23 for improvement of the detection sensitivity thereof.

Further, in the above description, the action when the arm 22 stops is explained as an example, however, the same control method may be used in the action when the arm 22 decelerates.

Figure 10:
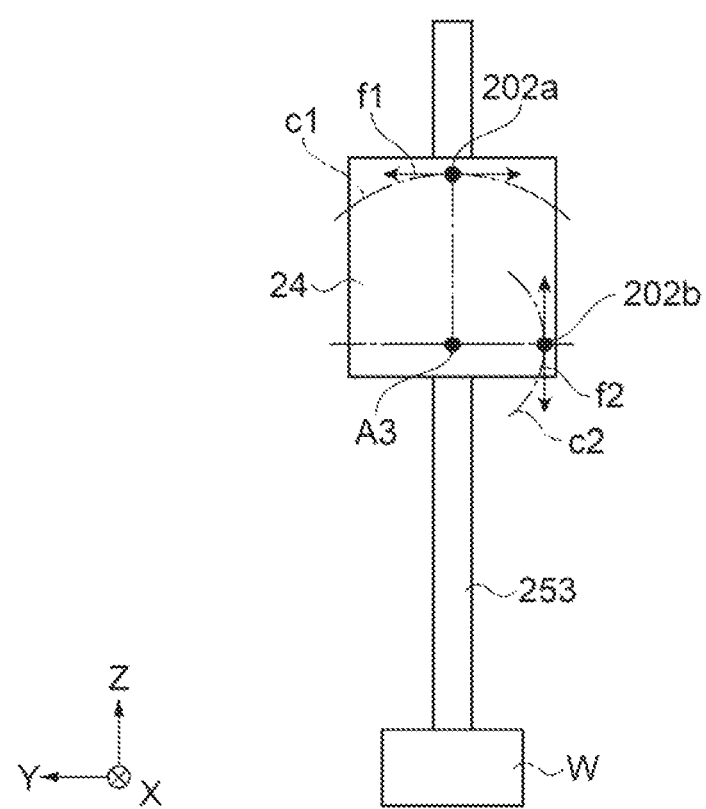
FIG. 10 is a schematic diagram for explanation of a placement example of acceleration sensors of a robot system according to a second embodiment.
Figure 11:
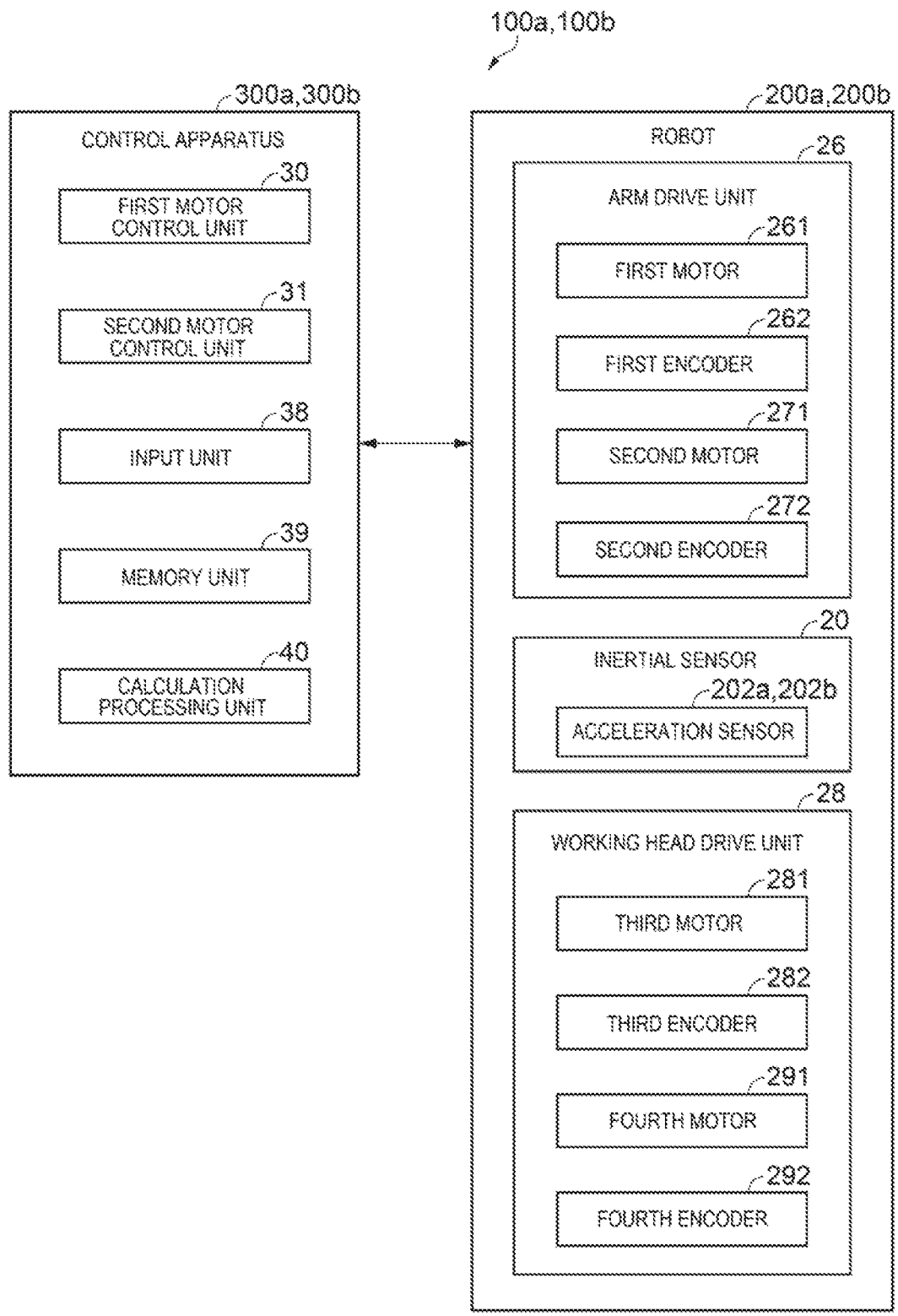
FIG. 11 is a block diagram showing a control system of the robot system according to the second embodiment.
Figure 12:
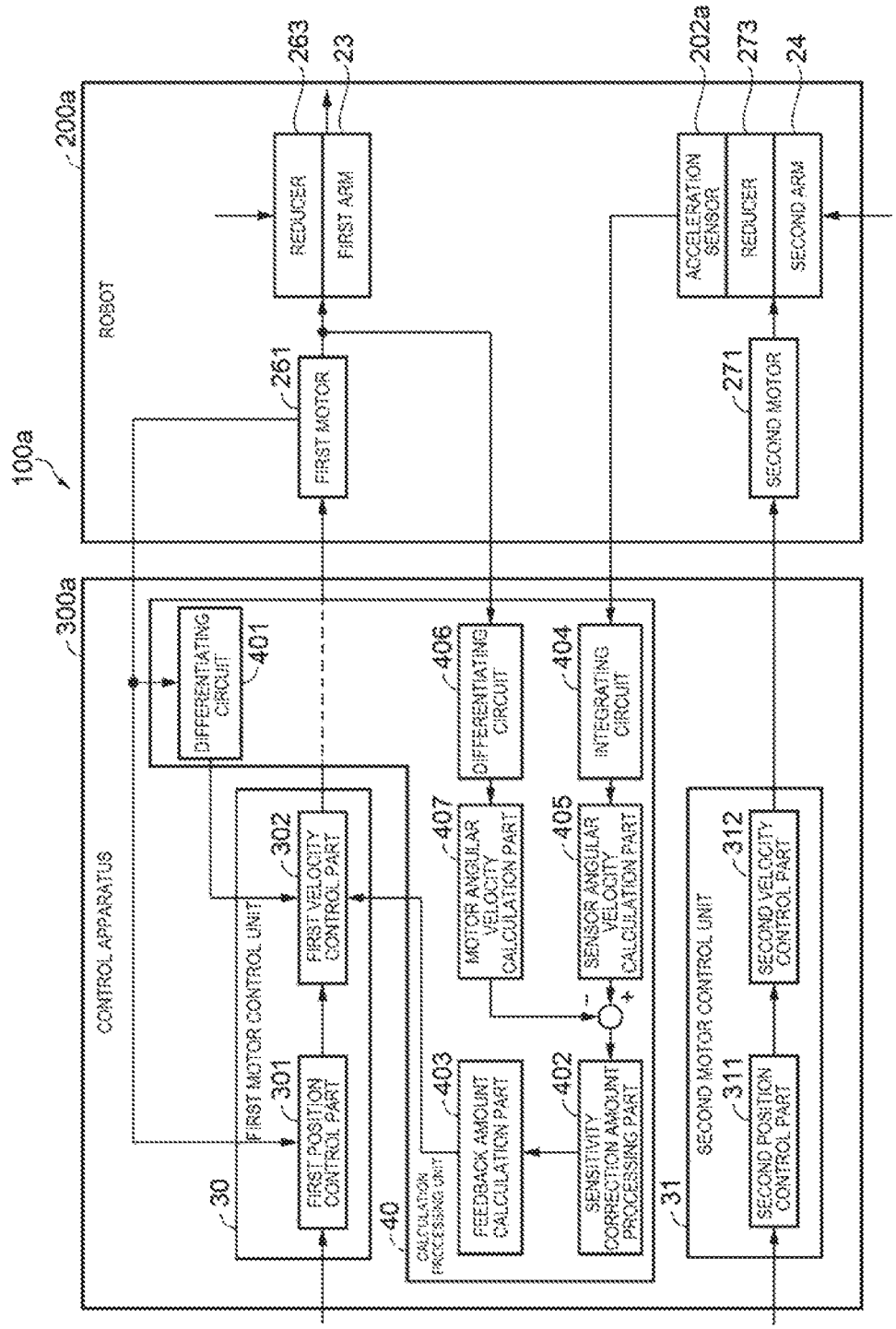
FIG. 12 is a block diagram showing Example 1 of a circuit system of the robot system according to the second embodiment.
Figure 13:
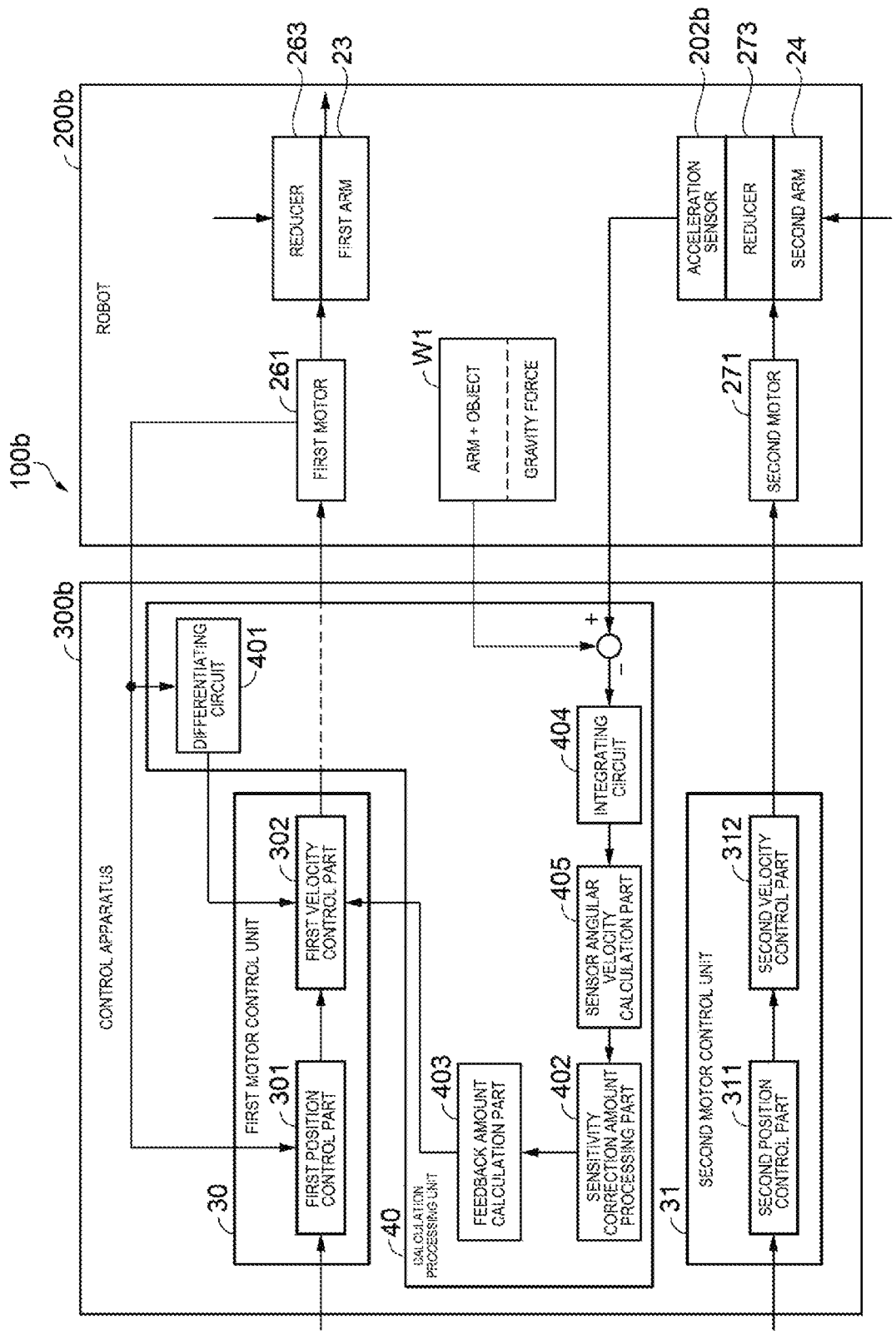
FIG. 13 is a block diagram showing Example 2 of the circuit system of the robot system according to the second embodiment.

2. Second Embodiment 2.1. Overall Configuration of Robot System According to Second Embodiment Next, a configuration of a robot system according to the second embodiment will be explained with reference to FIGS. 10, 11, 12, and 13. FIG. 10 is the schematic diagram for explanation of the placement example of the acceleration sensors of the robot system according to the second embodiment. FIG. 11 is the block diagram showing the control system of the robot system according to the second embodiment. FIG. 12 is the block diagram showing Example 1 of the circuit system of the robot system according to the second embodiment. FIG. 13 is the block diagram showing Example 2 of the circuit system of the robot system according to the second embodiment.

As shown in FIG. 11, a robot system 100a, 100b according to the second embodiment is different from the robot system 1 according to the above described first embodiment in that an acceleration sensor 202a, 202b is used as the inertial sensor 20 provided in a robot 200a, 200b. Further, in the robot system 100a, 100b according to the second embodiment, a configuration of a control apparatus 300a, 300b is different. The rest of the configuration of the robot system 100a, 100b is the same as that of the robot system 1 according to the above described first embodiment. Therefore, as below, the detailed explanation of the same configurations as those of the robot system 1 may be omitted. Further, the same components as those of the robot system 1 will be explained with the same names and the same signs.

As shown in FIG. 11, the robot system 100a, 100b according to the second embodiment uses the acceleration sensor 202a, 202b as the inertial sensor 20 in the robot 200a, 200b. Note that it is desirable that the acceleration sensor 202a, 202b is attached to a position apart from the first pivot axis J1 of the first arm 23 and the second pivot axis J2 of the second arm 24 for detection of an acceleration in a twist direction as the roll direction of the arm 22.

Further, the acceleration sensor 202a, 202b detects the acceleration in the different direction depending on the attachment position thereof. FIG. 10 shows the attachment positions of the acceleration sensors 202a, 202b to the second arm 24 as seen from the direction of Q1 in FIG. 1. In FIG. 10, Example 1 in which the acceleration sensor 202a is attached to the upside of the third angular velocity detection axis A3 of the second arm 24 as the roll axis of the arm 22 and Example 2 in which the acceleration sensor 202b is attached onto the horizontal plane of the third angular velocity detection axis A3 of the second arm 24 are exemplified. Note that, in the second arm 24, the spline shaft 253 as the shaft provided in the different position from that of the second pivot axis J2, moving in the axial direction of the linear motion axis parallel to one of the first pivot axis J1 and the second pivot axis J2 in the working head 25, and provided with the end effector 4 at lower one end side thereof is provided. In other words, the spline shaft 253 is provided along the Z-direction as the vertical direction, and the object W is gripped at the lower end thereof.

The acceleration sensor 202a according to Example 1 and the acceleration sensor 202b according to Example 2 detect accelerations in tangential directions f1, f2 of respective circles c1, c2 both around the third angular velocity detection axis A3 of the second arm 24 as the roll axis of the arm 22. Further, the control apparatus 300a, 300b to be described later performs the feedback control based on the acceleration detected by the acceleration sensor 202a, 202b and the correction sign as the information representing the pivot direction of the arm 22 about the roll axis explained in the above described first embodiment, and controls the actuation of the first motor 261. By the control of the actuation of the first motor 261, the vibration generated in the spline shaft 253 of the working head 25 (see FIG. 2), e.g. the vibration at the control point P1 (see FIG. 2) at the end effector 4 side generated in the spline shaft 253 may be suppressed.

The robot 200a, 200b is a horizontal articulated robot also called a scalar robot. The configuration thereof is the same as the robot 2 of the first embodiment and the detailed explanation is omitted. Note that the robot 200a, 200b has the first arm 23 coupled to the base 21 and being pivotable about the first pivot axis J1 relative to the base 21, and the second arm 24 provided in the distal end portion of the first arm 23 and pivotably coupled about the second pivot axis J2 parallel to the first pivot axis J1 relative to the first arm 23. Note that, like the first embodiment, the first arm 23 contains a member having flexibility e.g. a resin or the like in a member forming the outer surface thereof.

As below, a configuration example of the acceleration sensor 202a according to Example 1 and a configuration example of the acceleration sensor 202b according to Example 2 will be sequentially explained.

2.2. Control Method and Control Apparatus for Suppression of Arm Vibration According to Example 1

The acceleration sensor 202a forming the robot system 100a according to Example 1 of the second embodiment is, as shown in FIG. 10, attached to the upside of the third angular velocity detection axis A3 of the second arm 24 as the roll axis of the arm 22 and detects the acceleration in the tangential direction f1 of the circle c1 around the third angular velocity detection axis A3, i.e., the horizontal direction.

The acceleration sensor 202a that detects the acceleration in the horizontal direction is attached to the upside of the third angular velocity detection axis A3, and thereby, also detects an arm angular velocity by the robot arm driving as another component than the twist vibration component in the roll direction. To address the problem, in the robot system 100a, a difference between an arm distal end angular velocity calculated from the angular velocity of the first motor 261 and an arm distal end angular velocity in the placement location of the acceleration sensor 202a is obtained and used as a detection value of only the twist vibration component in the acceleration sensor 202a.

As shown in FIG. 12, the robot system 100a having the configuration according to Example 1 has the robot 200a and the control apparatus 300a. As shown in FIG. 11, the robot 200a has the arm drive unit 26, the working head drive unit 28, and the inertial sensor 20 having the same configurations as those of the first embodiment. The inertial sensor 20 in Example 1 is the acceleration sensor 202a.

The control apparatus 300a has the first motor control unit 30, the second motor control unit 31, the input unit 38, the memory unit 39, and a calculation processing unit 40 (see FIG. 11). The calculation processing unit 40 has the differentiating circuit 401, the sensitivity correction amount processing part 402, the feedback amount calculation part 403, an integrating circuit 404, a sensor angular velocity calculation part 405, a differentiating circuit 406, and a motor angular velocity calculation part 407.

The first motor control unit 30 includes the first position control part 301 and the first velocity control part 302, and controls the actuation of the first motor 261 that pivots the first arm 23 about the first pivot axis J1. Further, the first motor control unit 30 performs the feedback control on the first motor 261 based on the angular velocity calculated from the acceleration detected by the acceleration sensor 202a and the correction sign as the information representing the pivot direction of the arm 22 about the roll axis when the arm 22 pivots about the second pivot axis J2. Here, the first motor 261 may pivot the first arm 23 via the reducer 263 by actuation control by the first motor control unit 30.

Specifically, the first velocity control part 302 calculates the angular velocity from the acceleration detected by the acceleration sensor 202a using the correction sign as the information representing the pivot direction of the arm 22 about the roll axis, and controls the actuation of the first motor 261 so that the arm 22 may move in a direction in which the angular velocity is cancelled out. That is, the control apparatus 300a controls the actuation of the first motor 261 as velocity control and moves the arm 22 in a direction in which the angular velocity is generated, and thereby, cancels out the angular velocity and reduces the angular velocity.

Then, the first position control part 301 performs position control of returning to the target position by the distance of the movement by the first velocity control part 302 for cancelling out and reducing the angular velocity. Thereby, the distal end portion of the second arm 24, in other words, the spline shaft 253 is moved to the target position.

In the above described manner, the first velocity control part 302 controls the velocity of the first motor 261 based on the output from the acceleration sensor 202a and the correction sign as the information representing the pivot direction of the arm 22 about the roll axis to suppress the vibration of the second arm 24 about the roll axis due to the angular velocity, and the first position control part 301 moves the arm to the target position by the amount of displacement due to the vibration by position control. Thereby, the distal end portion of the second arm 24 may be brought to the target position more accurately in a shorter time.

The first position control part 301 is a part that generates a velocity command to the first motor 261 to pivot the first arm 23 about the first pivot axis J1 based on e.g. a position command stored in the memory unit 39 in advance.

The first velocity control part 302 is a part that generates a current command to drive the first motor 261 based on the velocity command generated in the first position control part 301.

The second motor control unit 31 includes the second position control part 311 and the second velocity control part 312, and controls the actuation of the second motor 271 that pivots the second arm 24 about the first pivot axis J1. Here, the second motor 271 may pivot the second arm 24 via the reducer 273 by actuation control by the second motor control unit 31.

The second position control part 311 is a part that generates a velocity command to the second motor 271 to pivot the second arm 24 about the second pivot axis J2 based on e.g. a position command stored in the memory unit 39 in advance.

The second velocity control part 312 is a part that generates a current command to drive the second motor 271 based on the velocity command generated in the second position control part 311.

The differentiating circuit 401 is a part that differentiates the pivot angle about the first pivot axis J1 of the first arm 23 obtained by the output from the second encoder 272. An angular velocity command as a command generated by the differentiation is input to the first velocity control part 302 and superimposed on the current command to drive the first motor 261.

The integrating circuit 404 is a part that integrates a distal end acceleration of the distal end portion of the second arm 24, i.e., the distal end portion of the arm 22 obtained by the acceleration sensor 202a and converts the acceleration into velocity information. A distal end velocity as the velocity information in the horizontal direction of the arm 22 distal end generated by the integration is input to the sensor angular velocity calculation part 405 and converted into a sensor angular velocity in the horizontal direction of the arm 22 distal end.

The sensor angular velocity calculation part 405 calculates the sensor angular velocity in the horizontal direction in the distal end portion of the arm 22 by processing of the distal end velocity of the arm 22 output from the integrating circuit 404 using 1/L. Here, as shown in FIG. 1, L is a distance from the first pivot axis J1 of the first motor 261 to the acceleration sensor 202a.

The differentiating circuit 406 is a part that differentiates the pivot angle about the first pivot axis J1 of the first arm 23 obtained by the output from the second encoder 272.

The motor angular velocity calculation part 407 multiplies the differential value of the pivot angle about the first pivot axis J1 in the first arm 23 output from the differentiating circuit 406 by a reduction ratio of the reducer 263 to calculate the motor angular velocity in the distal end portion of the arm 22.

Then, the calculation processing unit 40 obtains a difference between the sensor angular velocity calculated by the sensor angular velocity calculation part 405 and the motor angular velocity calculated by the motor angular velocity calculation part 407, and generates an angular velocity of only the vibration component about the roll axis of the arm 22.

The sensitivity correction amount processing part 402 performs processing of multiplying the angular velocity of only the vibration component about the roll axis of the arm 22 calculated by the integrating circuit 404, the sensor angular velocity calculation part 405, the differentiating circuit 406, and the motor angular velocity calculation part 407 from the acceleration detected by the acceleration sensor 202a by a defined sensitivity correction amount to obtain a control amount usable for feedback control. As the processing, in the embodiment, the angular velocity is multiplied by a coefficient k1. Note that the coefficient k1 is an arbitrary numeric value larger than zero. For example, when 0<k1<1, the angular velocity is decreased in the sensitivity correction amount processing part 402. On the other hand, when the correction in the sensitivity correction amount processing part 402 is omitted, the angular velocity having the unchanged magnitude, i.e., without being decreased is input to the feedback amount calculation part 403 and, as a result, smooth pivot of the first arm 23 about the first pivot axis J1 may be difficult.

The feedback amount calculation part 403 calculates an angular velocity feedback value from the control amount based on the angular velocity of the vibration component in the horizontal direction processed in the sensitivity correction amount processing part 402 and sends the value to the first velocity control part 302. That is, feedback based on the angular velocity of the vibration component in the horizontal direction calculated from the acceleration detected by the acceleration sensor 202a is not performed on the first position control part 301, but performed on the first velocity control part 302.

In the control method of the robot system 100a using the above described robot 200a and control apparatus 300a, by the feedback control based on the angular velocity of the vibration component in the horizontal direction calculated from the acceleration detected by the acceleration sensor 202a and the correction sign as the information representing the pivot direction of the arm 22 about the roll axis, the first motor 261 pivoting the first arm 23 is brought into a drive state according to the position command and the velocity command. In the drive state, the movement about the third angular velocity detection axis A3 of the spline shaft 253 provided in the distal end portion of the second arm 24 may be cancelled out and the vibration may be suppressed. Thereby, the position of the spline shaft 253 is determined in a shorter time.

As above, according to the robot system 100a of Example 1 of the above described second embodiment, the first motor control unit 30 performs feedback control on the first motor 261 based on the angular velocity of the vibration component in the horizontal direction calculated from the acceleration of the arm 22 in the horizontal direction detected by the acceleration sensor 202a as the example of the inertial sensor 20 and the correction sign as the information representing the pivot direction of the arm 22 about the roll axis. The feedback control controls the actuation of the first motor 261 to suppress the vibration of the arm 22 about the roll axis generated in the spline shaft 253 provided in the distal end portion of the second arm 24, and thereby, may suppress the vibration of the spline shaft 253 provided in the distal end portion of the second arm 24 and determine the position of the spline shaft 253.

2.3. Control Method and Control Apparatus for Suppression of Arm Vibration According to Example 2

The acceleration sensor 202b forming the robot system 100b according to Example 2 of the second embodiment is, as shown in FIG. 10, attached to the horizontal plane along the Y-axis in the drawing of the third angular velocity detection axis A3 of the second arm 24 as the roll axis of the arm 22 and detects the acceleration in the tangential direction f2 of the circle c2 around the third angular velocity detection axis A3, i.e., the vertical direction.

The acceleration sensor 202b that detects the acceleration in the vertical direction is attached to the horizontal plane of the third angular velocity detection axis A3, and it is necessary to consider the influence by a gravity force W1 and constantly obtain a difference from the gravity force. To address the problem, in the robot system 100b, a difference between the acceleration detected by the acceleration sensor 202b and the gravity force W1 on the object W gripped by the arm 22 is obtained and used as a detection value of only the twist vibration component in the acceleration sensor 202b.

The calculation processing unit 40 obtains the difference between the acceleration detected by the acceleration sensor 202b and the gravity force W1 and inputs the difference value as the detection value of only the twist vibration component in the acceleration sensor 202b to the integrating circuit 404.

As shown in FIG. 13, the robot system 100b having the configuration according to Example 2 has the robot 200b and the control apparatus 300b. The robot 200b has the arm drive unit 26 and the working head drive unit 28 having the same configurations as those of the first embodiment, and the acceleration sensor 202b as the inertial sensor 20 (see FIG. 11).

The control apparatus 300b has the first motor control unit 30, the second motor control unit 31, the input unit 38, the memory unit 39, and the calculation processing unit 40 (see FIG. 11). The calculation processing unit 40 has the differentiating circuit 401, the sensitivity correction amount processing part 402, the feedback amount calculation part 403, the integrating circuit 404, and the sensor angular velocity calculation part 405.

The first motor control unit 30 includes the first position control part 301 as the position control part and the first velocity control part 302 as the velocity control part, and controls the actuation of the first motor 261 that pivots the first arm 23 about the first pivot axis J1. Further, the first motor control unit 30 performs feedback control on the first motor 261 based on the angular velocity calculated from the acceleration detected by the acceleration sensor 202b and the correction sign as the information representing the pivot direction of the arm 22 about the roll axis when the arm 22 pivots about the second pivot axis J2. Here, the first motor 261 may pivot the first arm 23 via the reducer 263 by actuation control by the first motor control unit 30.

Specifically, the first velocity control part 302 calculates the angular velocity from the acceleration detected by the acceleration sensor 202b using the correction sign as the information representing the pivot direction of the arm 22 about the roll axis, and controls the actuation of the first motor 261 so that the arm 22 may move in a direction in which the angular velocity is cancelled out. That is, the control apparatus 300b controls the actuation of the first motor 261 as velocity control and moves the arm 22 in a direction in which the angular velocity is generated, and thereby, cancels out the angular velocity and reduces the angular velocity.

Then, the first position control part 301 performs position control of returning to the target position by the distance of the movement by the first velocity control part 302 for cancelling out and reducing the angular velocity. Thereby, the distal end portion of the second arm 24, in other words, the spline shaft 253 is moved to the target position.

In the above described manner, the first velocity control part 302 controls the velocity of the first motor 261 based on the output from the acceleration sensor 202b to suppress the vibration of the second arm 24 about the roll axis due to the angular velocity, and the first position control part 301 moves the arm to the target position by the amount of displacement due to the vibration by position control. Thereby, the distal end portion of the second arm 24 may be brought to the target position more accurately in a shorter time.

The first position control part 301 is a part that generates a velocity command to the first motor 261 to pivot the first arm 23 about the first pivot axis J1 based on e.g. a position command stored in the memory unit 39 in advance.

The first velocity control part 302 is a part that generates a current command to drive the first motor 261 based on the velocity command generated in the first position control part 301.

The second motor control unit 31 includes the second position control part 311 and the second velocity control part 312, and controls the actuation of the second motor 271 that pivots the second arm 24 about the first pivot axis J1. Here, the second motor 271 may pivot the second arm 24 via the reducer 273 by actuation control by the second motor control unit 31.

The second position control part 311 is a part that generates a velocity command to the second motor 271 to pivot the second arm 24 about the second pivot axis J2 based on e.g. a position command stored in the memory unit 39 in advance.

The second velocity control part 312 is a part that generates a current command to drive the second motor 271 based on the velocity command generated in the second position control part 311.

The differentiating circuit 401 is a part that differentiates the pivot angle about the first pivot axis J1 of the first arm 23 obtained by the output from the second encoder 272. An angular velocity command as a command generated by the differentiation is input to the first velocity control part 302 and superimposed on the current command to drive the first motor 261.

The integrating circuit 404 is a part that integrates the detection value of the difference between a distal end acceleration of the distal end portion of the second arm 24, i.e., the distal end portion of the arm 22 obtained by the acceleration sensor 202b and the gravity force W1 and converts the value into velocity information. A distal end velocity as the velocity information in the vertical direction of the distal end of the arm 22 generated by the integration is input to the sensor angular velocity calculation part 405 and converted into a sensor angular velocity in the horizontal direction of the arm 22 distal end.

The sensor angular velocity calculation part 405 calculates the sensor angular velocity in the vertical direction in the distal end portion of the arm 22 from the distal end velocity of the arm 22 output from the integrating circuit 404.

The sensitivity correction amount processing part 402 performs processing of multiplying the angular velocity of only the vibration component about the roll axis of the arm 22 calculated by the integrating circuit 404 and the sensor angular velocity calculation part 405 from the acceleration detected by the acceleration sensor 202b by a defined sensitivity correction amount to obtain a control amount usable for feedback control. As the processing, in the embodiment, the angular velocity is multiplied by a coefficient k1. Note that the coefficient k1 is an arbitrary numeric value larger than zero. For example, when 0<k1<1, the angular velocity is decreased in the sensitivity correction amount processing part 402. On the other hand, when the correction in the sensitivity correction amount processing part 402 is omitted, the angular velocity having the unchanged magnitude, i.e., without being decreased is input to the feedback amount calculation part 403 and, as a result, smooth pivot of the first arm 23 about the first pivot axis J1 may be difficult.

The feedback amount calculation part 403 calculates an angular velocity feedback value from the control amount based on the angular velocity of the vibration component in the vertical direction processed in the sensitivity correction amount processing part 402 and sends the value to the first velocity control part 302. That is, feedback based on the angular velocity of the vibration component in the vertical direction calculated from the acceleration detected by the acceleration sensor 202b is not performed on the first position control part 301, but performed on the first velocity control part 302.

In the control method of the robot system 100b using the above described robot 200b and control apparatus 300b, by the feedback control based on the angular velocity of the vibration component in the vertical direction along the Z-axis in FIG. 10 calculated from the acceleration detected by the acceleration sensor 202b and the correction sign as the information representing the pivot direction of the arm 22 about the roll axis, the first motor 261 pivoting the first arm 23 is brought into a drive state according to the position command and the velocity command. In the drive state, the movement about the third angular velocity detection axis A3 of the spline shaft 253 provided in the distal end portion of the second arm 24 may be cancelled out and the vibration may be suppressed. Thereby, the position of the spline shaft 253 is determined in a shorter time.

As above, according to the robot system 100b of Example 2 of the above described second embodiment, the first motor control unit 30 performs feedback control on the first motor 261 based on the angular velocity of the vibration component in the vertical direction calculated from the acceleration of the arm 22 in the vertical direction detected by the acceleration sensor 202b as the example of the inertial sensor 20 and the correction sign as the information representing the pivot direction of the arm 22 about the roll axis. The feedback control controls the actuation of the first motor 261 to suppress the vibration of the arm 22 about the roll axis generated in the spline shaft 253 provided in the distal end portion of the second arm 24, and thereby, may suppress the vibration of the spline shaft 253 provided in the distal end portion of the second arm 24 and determine the position of the spline shaft 253.

Note that the above described first embodiment and second embodiment, the configurations of the robot systems 1, 100a, 100b are explained as the configurations in which the control apparatuses 3, 300a, 300b are provided outside of the robots 2, 200a, 200b, however, not limited to those. The control apparatuses 3, 300a, 300b may be provided outside or inside of the robots 2, 200a, 200b.

In the above described first embodiment and second embodiment, the configuration in which the inertial sensor 20 is provided in the second arm 24 is explained, however, not limited to that. The inertial sensor 20 may be provided in the spline shaft 253 forming the working head 25.

The feedback control by the robot system 1 is preferable for a robot with an arm having a configuration easily torsionally displaced like the first arm 23 containing a member having flexibility in the outer surface thereof including the robots 2, 200a, 200b.

As below, the details derived from the above described embodiments will be described as respective embodiments.

Embodiment 1

A robot system according to the embodiment includes a robot having an arm pivoting about a pivot axis, a motor pivoting the arm about the pivot axis, a shaft coupled to the arm and moving in an axial direction of a linear motion axis parallel to the pivot axis, and an inertial sensor provided in the arm or shaft, and a control apparatus having a control unit controlling the motor, wherein the inertial sensor detects an angular velocity about a roll axis orthogonal to the pivot axis and the linear motion axis or an acceleration in a tangential direction of a circle around the roll axis, and the control unit controls the motor based on information representing a pivot direction of the arm about the roll axis when the arm stops or decelerates and output from the inertial sensor.

According to the robot system of the embodiment, when the arm stops or decelerates, the control unit of the control apparatus controls the motor based on the angular velocity about the roll axis orthogonal to the pivot axis and the linear motion axis or the acceleration in the tangential direction of the circle around the roll axis output from the inertial sensor in consideration of the pivot direction of the arm about the roll axis when the arm stops or decelerates, and thereby, the vibration of the arm about the roll axis may be suppressed.

Embodiment 2

A robot system according to the embodiment includes a robot having an arm including a first arm pivoting about a first pivot axis and a second arm coupled to the first arm and pivoting about a second pivot axis parallel to the first pivot axis, a first motor pivoting the first arm about the first pivot axis, a shaft coupled to the second arm and moving in an axial direction of a linear motion axis parallel to the pivot axis, and an inertial sensor provided in the second arm or the shaft, and a control apparatus having a control unit controlling the first motor, wherein the inertial sensor detects an angular velocity about a roll axis orthogonal to the pivot axis and the linear motion axis or an acceleration in a tangential direction of a circle around the roll axis, and the control unit controls the first motor based on information representing a pivot direction of the arm about the roll axis when the arm stops or decelerates and output from the inertial sensor.

According to the robot system of the embodiment, when the arm including the first arm pivoting about the first pivot axis and the second arm coupled to the first arm and pivoting about the second pivot axis parallel to the first pivot axis stops or decelerates, the control unit of the control apparatus controlling the first motor controls the first motor based on the angular velocity about the roll axis orthogonal to the pivot axis and the linear motion axis or the acceleration in the tangential direction of the circle around the roll axis output from the inertial sensor in consideration of the pivot direction of the arm about the roll axis when the arm stops or decelerates, and thereby, the vibration of the arm about the roll axis may be suppressed.

Embodiment 3

In the robot system according to the embodiment, the information may be obtained based on the output from the inertial sensor.

According to the embodiment, the information representing the pivot direction of the arm when the arm stops or decelerates is obtained based on the output from the inertial sensor, and thereby, proper motor control according to the actual pivot state of the arm may be performed.

Embodiment 4

In the robot system according to the embodiment, the control unit may have a memory unit, and the information may be stored in the memory unit.

According to the embodiment, the control unit controls the motor based on the information representing the pivot direction of the arm when the arm stops or decelerates stored in the memory unit and the output from the inertial sensor about the roll axis, and thereby, the vibration of the arm about the roll axis may be suppressed.

Embodiment 5

In the robot system according to the embodiment, the information may have first information representing the pivot direction when the shaft is located in a first position and second information representing the pivot direction when the shaft is located in a second position higher than the first position.

According to the embodiment, the motor is controlled based on the two pieces of information of the first information representing the pivot direction when the shaft is located in the first position and the second information representing the pivot direction when the shaft is located in the second position higher than the first position and the output from the inertial sensor about the roll axis, and thereby, the vibration of the arm about the roll axis may be suppressed more effectively.

Embodiment 6

In the robot system according to the embodiment, the control unit may control the motor without using the information when the shaft is located between the first position and the second position.

According to the embodiment, the control unit performs control of the motor in a position where no pivot of the shaft occurs between the first position and the second position without using the information representing the pivot direction of the arm when the arm stops or decelerates, and thereby, stable motor control may be performed.

Embodiment 7

In the robot system according to the embodiment, the shaft may be provided with a load, and the information may be based on a weight of the load.

According to the embodiment, the control unit calculates the information representing the pivot direction of the arm when the arm stops or decelerates based on the weight of the load of the shaft and controls the motor, and thereby, the vibration of the arm about the roll axis may be suppressed more effectively.

Embodiment 8

In the robot system according to the embodiment, a member forming an outer surface of the arm may contain a resin.

According to the embodiment, contact impact with the arm may be reduced by buffer action due to flexibility of the resin forming the outer surface of the arm. Even when the outer surface of the arm is formed using the resin having the buffer action, the motor is controlled based on the detection result of the inertial sensor, and thereby, the vibration of the arm about the roll axis may be suppressed.

Embodiment 9

A control apparatus according to the embodiment is a control apparatus for a robot having an arm pivoting about a pivot axis by a motor, a shaft coupled to the arm and moving in an axial direction of a linear motion axis parallel to the pivot axis, and an inertial sensor detecting an angular velocity about a roll axis orthogonal to the pivot axis and the linear motion axis or an acceleration in a tangential direction of a circle around the roll axis, including a control unit controlling the motor, wherein the control unit controls the motor based on information representing a pivot direction of the arm about the roll axis when the arm stops or decelerates and output from the inertial sensor.

According to the control apparatus of the embodiment, the control unit controls the motor based on the output from the inertial sensor about the roll axis in consideration of the pivot direction in which the arm moves due to inertia of the arm as seen from the axial direction of the roll axis when the arm of the robot stops or decelerates, and thereby, the vibration of the arm about the roll axis may be suppressed.

Embodiment 10

In the control apparatus according to the embodiment, the information may be obtained based on the output from the inertial sensor.

According to the embodiment, the control apparatus obtains the information representing the pivot direction of the arm when the arm stops or decelerates based on the output from the inertial sensor, and thereby, proper motor control according to the actual pivot state of the arm may be performed.

Embodiment 11

In the control apparatus according to the embodiment, the control unit may have a memory unit, and the information may be stored in the memory unit.

According to the embodiment, the control unit controls the motor based on the information representing the pivot direction of the arm when the arm stops or decelerates stored in the memory unit and the output from the inertial sensor about the roll axis, and thereby, the vibration of the arm about the roll axis may be suppressed.

Embodiment 12

In the control apparatus according to the embodiment, the information may have first information representing the pivot direction when the shaft is located in a first position and second information representing the pivot direction when the shaft is located in a second position higher than the first position.

According to the embodiment, the control apparatus controls the motor based on the two pieces of information of the first information representing the pivot direction when the shaft is located in the first position and the second information representing the pivot direction when the shaft is located in the second position higher than the first position and the output from the inertial sensor about the roll axis, and thereby, the vibration of the arm about the roll axis may be suppressed more effectively.

Embodiment 13

In the control apparatus according to the embodiment, the control unit may control the motor without using the information when the shaft is located between the first position and the second position.

According to the embodiment, the control apparatus performs control of the motor in the position where no pivot of the shaft occurs between the first position and the second position without using the information representing the pivot direction of the arm when the arm stops or decelerates, and thereby, efficient control may be performed.

Embodiment 14

In the control apparatus according to the embodiment, the shaft may be provided with a load, and the information may be based on a weight of the load.

According to the embodiment, the control apparatus calculates the information representing the pivot direction of the arm when the arm stops or decelerates based on the weight of the load of the shaft and controls the motor, and thereby, the vibration of the arm about the roll axis may be suppressed more effectively.

Embodiment 15

A control method according to the embodiment is a control method for a robot having an arm pivoting about a pivot axis by a motor, a shaft coupled to the arm and moving in an axial direction of a linear motion axis parallel to the pivot axis, and an inertial sensor, including a detection step of detecting an angular velocity about a roll axis orthogonal to the pivot axis and the linear motion axis or an acceleration in a tangential direction of a circle around the roll axis by the inertial sensor, and a control step of controlling the motor based on the detected angular velocity or acceleration and information representing a pivot direction of the arm about the roll axis when the arm stops or decelerates.

According to the control method of the embodiment, through the detection step of detecting the angular velocity about the roll axis orthogonal to the pivot axis and the linear motion axis or the acceleration in the tangential direction of the circle around the roll axis and the control step of controlling the motor based on the detected angular velocity or acceleration and the information representing the pivot direction of the arm about the roll axis when the arm stops or decelerates, the motor is controlled based on the output from the inertial sensor about the roll axis in consideration of the pivot direction in which the arm moves due to inertia of the arm as seen from the axial direction of the roll axis when the arm of the robot stops or decelerates, and thereby, the vibration of the arm about the roll axis when the arm stops or decelerates may be suppressed.

Embodiment 16

In the control method according to the embodiment, the information may be obtained based on the output from the inertial sensor.

According to the control method of the embodiment, the information representing the pivot direction of the arm when the arm stops or decelerates is obtained based on the output from the inertial sensor, and thereby, proper motor control according to the actual pivot state of the arm may be performed.

Embodiment 17

In the control method according to the embodiment, the information may be stored information.

According to the control method of the embodiment, the motor is controlled based on the stored information representing the pivot direction of the arm when the arm stops or decelerates and the output from the inertial sensor about the roll axis, and thereby, the vibration of the arm about the roll axis may be suppressed.

Embodiment 18

In the control method according to the embodiment, the information may have first information representing the pivot direction when the shaft is located in a first position and second information representing the pivot direction when the shaft is located in a second position higher than the first position.

According to the control method of the embodiment, the motor is controlled based on the two pieces of information of the first information representing the pivot direction when the shaft is located in the first position and the second information representing the pivot direction when the shaft is located in the second position higher than the first position and the output from the inertial sensor about the roll axis, and thereby, the vibration of the arm about the roll axis may be suppressed more effectively.

Embodiment 19

In the control method according to the embodiment, the control step may include a step of controlling the motor without using the information when the shaft is located between the first position and the second position.

According to the control method of the embodiment, the control step includes the step of performing control of the motor in the position where no pivot of the shaft occurs between the first position and the second position without using the information representing the pivot direction of the arm when the arm stops or decelerates, and thereby, efficient control may be performed.

Embodiment 20

In the control method according to the embodiment, the shaft may be provided with a load, and the information may be based on a weight of the load.

According to the control method of the embodiment, the information representing the pivot direction of the arm when the arm stops or decelerates is calculated based on the weight of the load of the shaft and the motor is controlled, and thereby, the vibration of the arm about the roll axis may be suppressed more effectively.

What is claimed is:

1. A robot system comprising:
a robot having an arm pivoting about a pivot axis, a motor pivoting the arm about the pivot axis, a shaft coupled to the arm and moving in an axial direction of a linear motion axis parallel to the pivot axis, and an inertial sensor provided in the arm or shaft; and
a control apparatus having a control unit controlling the motor, wherein
the inertial sensor detects an angular velocity about a roll axis orthogonal to the pivot axis and the linear motion axis or an acceleration in a tangential direction of a circle around the roll axis,
the control unit controls the motor based on information representing a pivot direction of the arm about the roll axis when the arm stops or decelerates and output from the inertial sensor,
the shaft is provided with a load, and
the information is based on a weight of the load.

2. The robot system according to claim 1, wherein
the arm includes a first arm pivoting about a first pivot axis and a second arm coupled to the first arm and pivoting about a second pivot axis parallel to the first pivot axis, and
the motor is a first motor pivoting the first arm about the first pivot axis.

3. The robot system according to claim 1, wherein
the information is obtained based on the output from the inertial sensor.

4. The robot system according to claim 1, wherein
the control unit has a memory unit, and
the information is stored in the memory unit.

5. The robot system according to claim 1, wherein
the information has first information representing the pivot direction when the shaft is located in a first position and second information representing the pivot direction when the shaft is located in a second position higher than the first position.

6. The robot system according to claim 5, wherein
the control unit controls the motor without using the information when the shaft is located between the first position and the second position.

7. The robot system according to claim 1, wherein
a member forming an outer surface of the arm contains a resin.

8. A control apparatus for a robot having an arm pivoting about a pivot axis by a motor, a shaft coupled to the arm and moving in an axial direction of a linear motion axis parallel to the pivot axis, and an inertial sensor detecting an angular velocity about a roll axis orthogonal to the pivot axis and the linear motion axis or an acceleration in a tangential direction of a circle around the roll axis, comprising a control unit controlling the motor, wherein
the control unit controls the motor based on information representing a pivot direction of the arm about the roll axis when the arm stops or decelerates and output from the inertial sensor,
the shaft is provided with a load, and
the information is based on a weight of the load.

9. The control apparatus according to claim 8, wherein
the information is obtained based on the output from the inertial sensor.

10. The control apparatus according to claim 8, wherein
the control unit has a memory unit, and
the information is stored in the memory unit.

11. The control apparatus according to claim 10, wherein
the information has first information representing the pivot direction when the shaft is located in a first position and second information representing the pivot direction when the shaft is located in a second position higher than the first position.

12. The control apparatus according to claim 11, wherein
the control unit controls the motor without using the information when the shaft is located between the first position and the second position.

13. A control method for a robot having an arm pivoting about a pivot axis by a motor, a shaft coupled to the arm and moving in an axial direction of a linear motion axis parallel to the pivot axis, and an inertial sensor, comprising:
detecting an angular velocity about a roll axis orthogonal to the pivot axis and the linear motion axis or an acceleration in a tangential direction of a circle around the roll axis by the inertial sensor;
controlling the motor based on the detected angular velocity or acceleration and information representing a pivot direction of the arm about the roll axis when the arm stops or decelerates,
the information is stored information,
the shaft is provided with a load, and
the information is based on a weight of the load.

14. The control method according to claim 13, wherein
the information is obtained based on the output from the inertial sensor.

15. The control method according to claim 13, wherein
the information has first information representing the pivot direction when the shaft is located in a first position and second information representing the pivot direction when the shaft is located in a second position higher than the first position.

16. The control method according to claim 15, wherein
the controlling includes controlling the motor without using the information when the shaft is located between the first position and the second position.

* * * * *